US010615905B2

(12) United States Patent
DeAndrea

(10) Patent No.: US 10,615,905 B2
(45) Date of Patent: Apr. 7, 2020

(54) METHOD AND APPARATUS FOR HARDWARE CONFIGURED NETWORK

(71) Applicant: Finisar Corporation, Horsham, PA (US)

(72) Inventor: John DeAndrea, New Hope, PA (US)

(73) Assignee: II-VI Incorporated, Saxonburg, PA (US)

( * ) Notice: Subject to any disclaimer, the term of this patent is extended or adjusted under 35 U.S.C. 154(b) by 0 days.

(21) Appl. No.: 15/973,829

(22) Filed: May 8, 2018

(65) Prior Publication Data

US 2018/0262294 A1    Sep. 13, 2018

Related U.S. Application Data

(63) Continuation of application No. 14/717,958, filed on May 20, 2015, now Pat. No. 9,998,254.

(51) Int. Cl.
*H04J 14/02* (2006.01)
*H04B 10/077* (2013.01)

(52) U.S. Cl.
CPC ...... *H04J 14/0278* (2013.01); *H04B 10/0773* (2013.01); *H04J 14/0212* (2013.01); *H04J 14/0267* (2013.01); *H04B 2210/074* (2013.01)

(58) Field of Classification Search
CPC .................................................. H04J 14/0278
USPC .............................................. 398/27, 43, 79
See application file for complete search history.

(56) References Cited

U.S. PATENT DOCUMENTS

| 5,615,034 | A | 3/1997 | Hori |
| 6,369,643 | B1 | 4/2002 | Lee et al. |
| 6,873,797 | B2 * | 3/2005 | Chang ................. H04L 12/1836 370/390 |
| 6,940,863 | B2 | 9/2005 | Xue et al. |

(Continued)

FOREIGN PATENT DOCUMENTS

| CN | 101103560 A | 1/2008 |
| CN | 101873513 A | 10/2010 |

(Continued)

OTHER PUBLICATIONS

Effect Photonics develops auto wavelength tuning for efficient DWDM network deployment, Sep. 25, 2018, 3 Pages, Effect Photonics B.V., Eindhoven, The Netherlands.

(Continued)

*Primary Examiner* — Oommen Jacob
(74) *Attorney, Agent, or Firm* — Kurt Rauschenbach; Rauschenbach Patent Law Group, PLLC

(57) ABSTRACT

An optical network element for a hardware configured optical network includes a first optical port that receives an input optical signal comprising receive control information from the hardware configured optical network. A demodulator optically coupled to the first optical port decodes the receive control information for configuring the optical network element. A modulator having an electrical modulation input that receives transmit control information imparts a modulation onto an optical carrier thereby generating a transmit optical control signal representing the transmit control information. A second optical port transmits the transmit optical control signal representing the transmit control information to the hardware configured optical network.

36 Claims, 15 Drawing Sheets

(56) References Cited

U.S. PATENT DOCUMENTS

| | | | |
|---|---|---|---|
| 7,480,103 B2 | 1/2009 | Huang et al. | |
| 7,840,103 B2 | 11/2010 | Chen et al. | |
| 9,444,553 B2 | 9/2016 | Lee | |
| 9,660,754 B2 | 5/2017 | Dahlfort et al. | |
| 9,692,547 B2 | 6/2017 | He et al. | |
| 9,832,166 B1 | 11/2017 | Butler et al. | |
| 10,148,382 B1 | 12/2018 | Olson et al. | |
| 2001/0017723 A1 | 8/2001 | Chang et al. | |
| 2002/0024707 A1 | 2/2002 | Lee et al. | |
| 2002/0131114 A1 | 9/2002 | Yoo | |
| 2002/0191250 A1 | 12/2002 | Graves et al. | |
| 2003/0048725 A1 | 3/2003 | Lee et al. | |
| 2003/0108004 A1 | 6/2003 | Kolodziej et al. | |
| 2003/0206741 A1* | 11/2003 | Ledentsov | H01S 5/18302 398/79 |
| 2004/0122888 A1 | 6/2004 | Carmichael | |
| 2004/0258356 A1 | 12/2004 | Brice et al. | |
| 2005/0078682 A1* | 4/2005 | Kim | H04L 12/413 370/395.5 |
| 2005/0232635 A1 | 10/2005 | Aronson et al. | |
| 2006/0024064 A1 | 2/2006 | Hecker et al. | |
| 2006/0120727 A1 | 6/2006 | Lee et al. | |
| 2006/0136798 A1 | 6/2006 | Domagala | |
| 2007/0014510 A1 | 1/2007 | Kusama | |
| 2007/0065149 A1* | 3/2007 | Stevens | H04J 14/00 398/45 |
| 2008/0089699 A1 | 4/2008 | Li et al. | |
| 2010/0008677 A1 | 1/2010 | Conroy et al. | |
| 2010/0046944 A1 | 2/2010 | Wagener et al. | |
| 2010/0191911 A1 | 7/2010 | Heddes et al. | |
| 2010/0209114 A1 | 8/2010 | Gloeckner et al. | |
| 2010/0239253 A1 | 9/2010 | Lin et al. | |
| 2010/0329680 A1 | 12/2010 | Presi et al. | |
| 2011/0236017 A1* | 9/2011 | Ohlen | H04J 14/0282 398/34 |
| 2012/0224851 A1 | 9/2012 | Takara et al. | |
| 2012/0301141 A1 | 11/2012 | Sakamoto et al. | |
| 2013/0004174 A1 | 1/2013 | Lee et al. | |
| 2013/0101254 A1 | 4/2013 | Cai et al. | |
| 2014/0010543 A1 | 1/2014 | Lee | |
| 2014/0255032 A1 | 9/2014 | Gottwald et al. | |
| 2014/0376909 A1 | 12/2014 | Frisken et al. | |
| 2016/0261343 A1* | 9/2016 | Akasaka | H04B 10/25073 |
| 2016/0344508 A1 | 11/2016 | DeAndrea | |
| 2017/0171647 A1 | 6/2017 | Gao | |
| 2018/0175964 A1 | 6/2018 | Zhao et al. | |

FOREIGN PATENT DOCUMENTS

| | | |
|---|---|---|
| CN | 102150385 A | 8/2011 |
| CN | 207766387 U | 8/2018 |
| EP | 2139155 A1 | 12/2009 |
| EP | 3025177 A1 | 7/2013 |
| JP | 2006186760 | 7/2006 |
| WO | 03/069812 A1 | 8/2003 |
| WO | 2013064912 A2 | 5/2013 |

OTHER PUBLICATIONS

Liu, et al., A Multichannel WDM-PON System with Port Agnostic Tunable SFP+ Transceiver Modules, 2018, 2 Pages, Zhejiang University CLEO Pacific Rim OSA, Hangzhou, China.

Notification of Transmittal of the International Search Report and the Written Opinion of the International Searching Authority, or the Declaration' for PCT/US2016/03310, dated Aug. 31, 2016, 18 pages, International Searching Authority, Korean Intellectual Property Office, Daejeon, Republic of Korea.

"Notification Concerning Transmittal of International Preliminary Report on Patentability (Chapter I of the Patent Cooperation Treaty)" for International Application No. PCT/US2016/033310, dated Nov. 30, 2017, 15 pages, The International Bureau of WIPO, Geneva, Switzerland.

"Notification of Transmittal of the International Search Report and the Written Opinion of the International Searching Authority, or the Declaration" for International Patent No. PCT/US2018/055789, dated Feb. 1, 2019, 18 pages, The International Searching Authority/ Korean Intellectual Property Office, Daejeon, Republic of Korea.

"Search Report" for European Patent Application No. 16797312.2, dated Jan. 7, 2019, 9 pages, European Patent Office, Munich, Germany.

"Office Action" for Chinese Patent Application No. 201680028574.7, dated Jul. 9, 2019, 7 pages, China National Intellectual Property Administration.

"Office Action" for Japanese Patent Application No. 2017-559853, dated Jun. 18, 2019, 3 pages, Japanese Patent Office.

"Notice of Allowance" for Japanese Patent Application No. 2017-559853, dated Nov. 1, 2019, 3 pages, Japanese Patent Office, Japan.

"Second Office Action" for Chinese Patent Application No. 201680028574.7, dated Nov. 29, 2019, 3 pages, China National Intellectual Property Administration, Beijing, China.

* cited by examiner

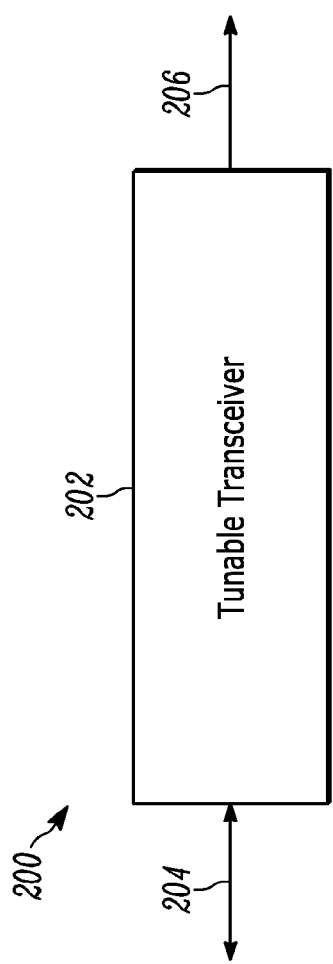

METHOD AND APPARATUS FOR HARDWARE CONFIGURED NETWORK

RELATED APPLICATION SECTION

The present application is a continuation of U.S. patent application Ser. No. 14/717,958, filed on May 20, 2015, entitled "Method and Apparatus for Hardware Configured Network". The entire contents of U.S. patent application Ser. No. 14/717,958 is herein incorporated by reference.

The section headings used herein are for organizational purposes only and should not to be construed as limiting the subject matter described in the present application in any way.

INTRODUCTION

The increasing need for high capacity data transmissions through optical fibers, together with the increasing number of optical network elements that are being flexibly and dynamically networked together, presents significant challenges to the fiber-optic telecommunications industry. For example, higher capacity demand requires that more transceiver wavelengths be spaced more tightly together in the spectral domain to provide higher capacity on a single fiber or connection. These high-capacity, high-channel-count systems demand more real-time performance data monitoring to control the transceivers. Furthermore, the larger numbers of transceivers needed for these high-capacity, high-channel-count systems demand more automation of transceiver configuration to improve reliability and to reduce human operations. Additionally, configuring networks to include an increased number and variety of optical elements, including transceivers, amplifiers, wavelength filters, wavelength multiplexers, wavelength demultiplexers, cross connects, optical switches, passive splitters, and combiners, demands automation and control schemes that are able to operate across a variety of optical element types.

It is desirable for high-capacity, high-channel-count systems to have automated configurations that allow network elements to self-provision and self-monitor in order to reduce the burden on network operations personnel during network turn-up and during on-going operation. The automation allows larger-scale optical networks to be constructed and operated at lower cost.

It is also desirable for high-capacity, high-channel-count optical communications systems to have dynamic and reconfigurable optical networks that provide improved network flexibility and bandwidth utilization. These optical communications systems often demand real-time configuration in reaction to changing conditions and data traffic demands. In addition, support for dynamic traffic routing requires advanced wavelength and channel monitoring for tuning transceiver and wavelength selective switch (WSS) wavelengths.

Furthermore, scaling optical communications systems to achieve high capacity and high channel counts requires that the enhanced configuration capability be provided within the same or smaller footprint as that of currently deployed optical communications. Therefore, it is desirable for configuration methods and apparatus to re-use and/or rely largely on existing network element components.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. In the drawings, like reference characters generally refer to like features and structural elements throughout the various figures. The drawings are not intended to limit the scope of the Applicant's teaching in any way.

FIG. 2A illustrates a block diagram of one embodiment of the hardware-configured optical element comprising an optical transceiver with a tunable transmitter.

DESCRIPTION OF VARIOUS EMBODIMENTS

Figure 1A:
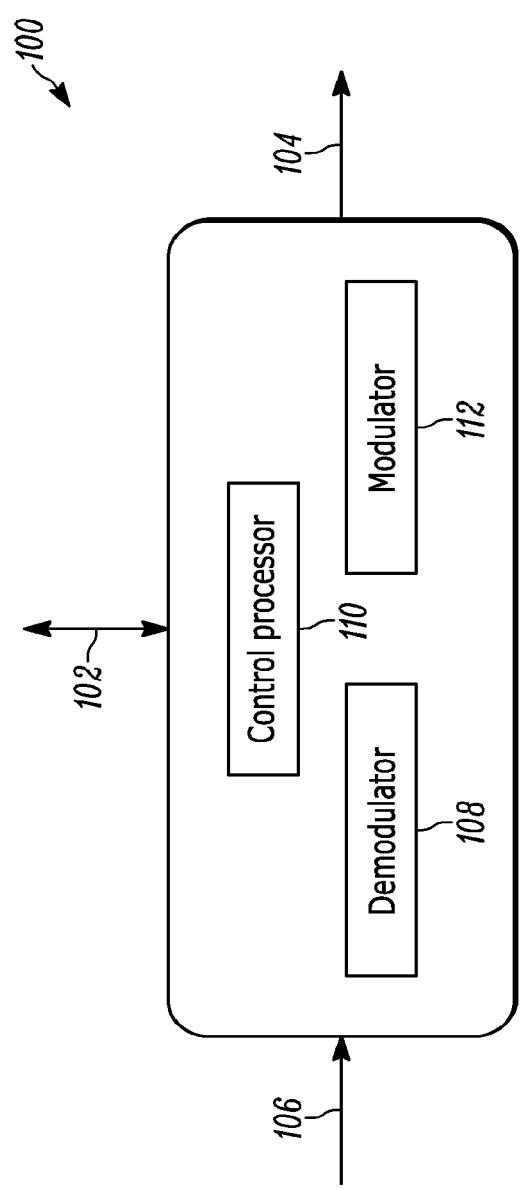
FIG. 1A illustrates a block diagram of an embodiment of a hardware-configured optical element of the present teaching.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The terms "element" or "network element" are used herein to describe various devices and optical subsystems used to build and operate optical networks. Some examples of these are transceivers, switches, wavelength selective switches, programmable filters, amplifiers, add drop multiplexers, and cross connects. The term "component" as used herein describes the optical, mechanical, and electronic components that make up these subsystems. The term "network" describes a plurality of network elements connected to form a group or system of elements that exchange information and operate cooperatively.

When used in connection with networks in this disclosure, the terms "configuration," "configuring," and "configure" are meant to include a variety of network management, control, and operations functions. For example, the term "configure" includes tasks such as element audits, element diagnosis, element performance monitoring, and control of element operating parameters. Some terms of art that should be considered part of the definition of "configure" include network management, network operations, FCAPS (fault management, configuration, accounting, performance, security), and network monitoring and alerting. Network management includes tasks such as configuring, discovering, identifying, and auditing network elements, discovering and reacting to faults or misconfigurations of network elements, and monitoring performance of network elements. In addition, the term "configure" can apply to a single element, or it can apply to a collection of elements operating or intending to operate as a connected system or network. In particular, the term "configuring a network" includes tasks such as network discovery, passive monitoring, and active control of network operation.

State-of-the-art optical network elements are configured largely via the optical client interfaces. Little or no management information is exchanged directly between elements, such as transceivers, wavelength selective switches, amplifiers, and other elements in the optical network. Configuration information is typically sent on a single channel, which limits the amount of management information and the number of network elements that can be configured. A single management or supervisory channel also limits the amount of information available to external network management systems, especially during turn-up operations.

Furthermore, in state-of-the-art optical network configuration systems, a large amount of diagnostic information is sent from network elements to one or more external network management systems or users for processing. The diagnostic information is processed in the external network management system, and instructions are subsequently sent back to the elements to generate network configuration changes. This remote and/or hands-on configuration architecture of known systems limits the scale of the networks that can be configured. This limitation is especially true as the amount of information that is required to be processed from the network elements increases in order to improve element monitoring and/or to provide dynamic element operations. For example, support for dynamic traffic routing requires optical elements that provide significant amounts of real-time data for optical path calculations, including in-line amplifier performance and dynamic path spectral conditions.

Therefore, it is highly desirable to have methods and apparatus for configuring elements in an optical network that are automated, tunable across multiple channels, and that work across a variety of optical elements that constitute the network. The present teaching relates, at least in part, to methods and apparatus for transmitting and processing control and management information for a hardware configured network (HCN). The term "hardware configured network" as used herein is a networked system of optical and electrical switching and transport elements and components that configure, control, and manage their operations automatically, with little or no user input.

One possible characteristic of a hardware configured network is that it connects and provisions channels and wavelengths automatically, without a centralized command or user intervention. Another possible characteristic of a hardware configured network is that it detects and corrects configuration errors without centralized command or user intervention. Yet another possible characteristic of a typical hardware configured network is that it reconfigures optical elements without a centralized command or user intervention. Examples of configurations performed by hardware configured networks include element turn up, tuning of tunable elements, programming of programmable optical filter characteristics (such as bandwidth, filter shape, dispersion, and other configurable parameters), setting attenuation levels of wavelength selective switches (WSS), setting gain and gain spectrum on erbium-doped fiber amplifiers (EDFA), and configuring ports and wavelengths per port for optical switches and wavelength add-drop multiplexers and cross connects. While aspects of the hardware configured network of the present teaching are described in connection with self-configuration of network elements, one skilled in the art will appreciate that user and/or centralized command or external management systems with access to information and configuration control of the hardware configured network may also be used in conjunction with self-configuration of network elements.

FIG. 1A illustrates a block diagram of an embodiment of a hardware-configured optical element according to the present teaching. The hardware-configured network of the present teaching transmits control information over the network using a low-frequency modulation that is modulated onto various optical signals traversing the network instead of using a dedicated supervisory optical channel.

That is, the optical carrier for the low-frequency modulation used to send and receive control information is some portion of the optical signals propagating in the network. These optical signals being used as the optical carrier in various embodiments of the hardware-configured network of the present teaching can include client data traffic, dummy signals, CW light, and amplified spontaneous emission. The term "optical carrier" as used herein is defined as any light upon which a modulation, which may be a low frequency modulation, is imposed. This definition is broader than other uses of this term in the art. For example, in some applications of optical communications, the term "optical carrier" is used to describe a particular wavelength of light used to carry data, often an ITU-grid-based wavelength from a laser transmitter. In various embodiments, the optical carriers can be generated in the optical element itself or can be an optical carrier that is received from the network.

The hardware-configurable optical element 100 includes an electronic control port 102 for sending and receiving electrical control information. The hardware-configurable optical element 100 also includes an output port that is coupled to a transmit optical fiber 104 for transmitting optical signals to the optical network and an input port that is couple to a receive optical fiber 106 for receiving from the optical network. A demodulator 108 decodes received control information, and sends the decoded control information to a control processor 110 that processes the information and then configures the optical element according to the control information.

An optical modulator 112 modulates an optical carrier with transmit control information so that transmit control information can be sent into the optical network. In one method of operation, the optical modulator 112 modulates the optical carrier with a low-frequency modulation representing the transmit control information. The transmit optical control signal is then sent to the network using a transmit fiber 104. In some methods of operation, the transmit optical control signal is imposed directly on a client data signal that serves as an optical carrier, and this combination of modulated optical signals is then transmitted on the transmit fiber 104.

Figure 1B:
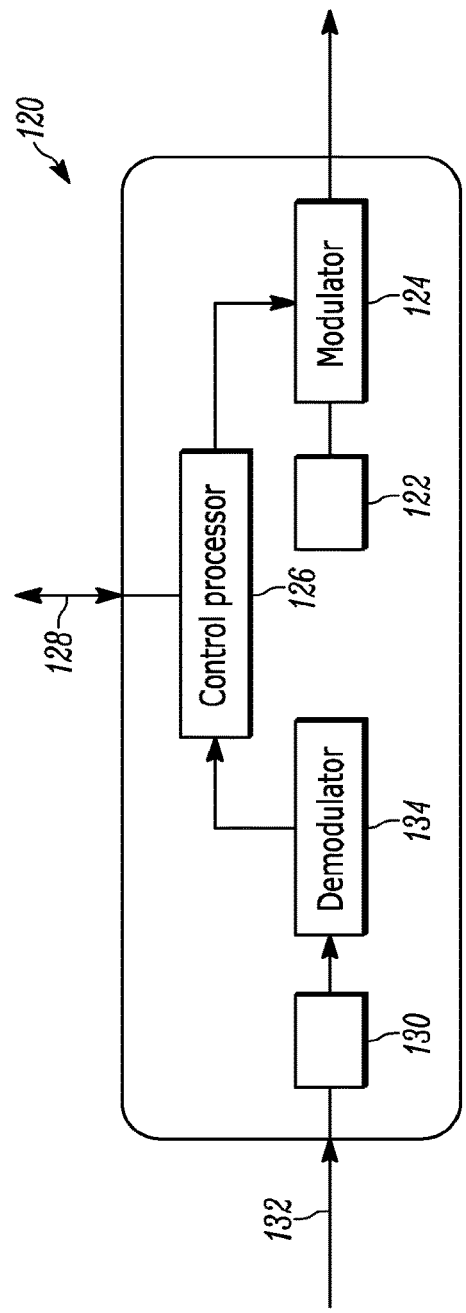
FIG. 1B illustrates a block diagram of an embodiment of a hardware-configured optical element of the present teaching in which the optical carrier signal is generated internal to the optical element.

FIG. 1B illustrates a block diagram of an embodiment of a hardware-configured optical element 120 of the present teaching in which the optical carrier signal is generated by an optical signal generator 122 internal to the optical element. In some embodiments, the optical signal generator 122 is part of a client transmitter of an optical transceiver element. In some embodiments, the optical signal generator 122 includes an optical amplifier and the optical carrier is amplified spontaneous emission. A modulator 124 is used to modulate the optical carrier with control information. In some methods of operation, the control information is generated by a local processor 126. In other methods of operation, the control information is generated by a remote source having an output that is electrically connected to an electronic control port 128. A splitter 130 is used to separate a portion of the input optical signal that includes the receive control signal from the optical network 132. A demodulator 134 decodes the receive control information, and then sends that receive control information to a control processor 126 which configures the hardware configured element 120 based on the control information provided.

Figure 1C:
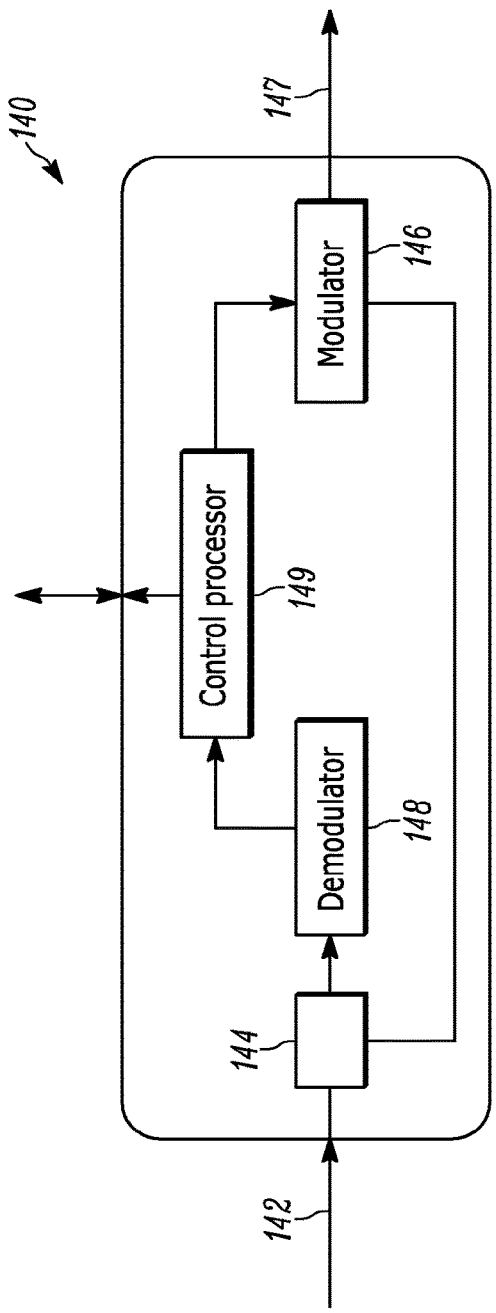
FIG. 1C illustrates a block diagram of an embodiment of a hardware-configured optical element of the present teaching in which the optical carrier signal comes from the optical network.

FIG. 1C illustrates a block diagram of an embodiment of a hardware-configured optical element 140 of the present teaching in which the optical carrier signal originates external to the optical element. The optical carrier originates from the optical network and arrives on input fiber 142. A portion of the optical signal from the input fiber 142 is separated and sent to a demodulator 148. The demodulator 148 decodes the receive control information, and then sends that receive control information to a control processor 149 which configures the hardware configured element 140 based on the control information provided. A portion of the optical signal is separated by the splitter 144 and sent to an optical modulator 146 that imparts the transmit control information onto the optical carrier in the form of low-frequency modulation. The transmit optical control signal then exits the optical element on transmit fiber 147.

Figure 1D:
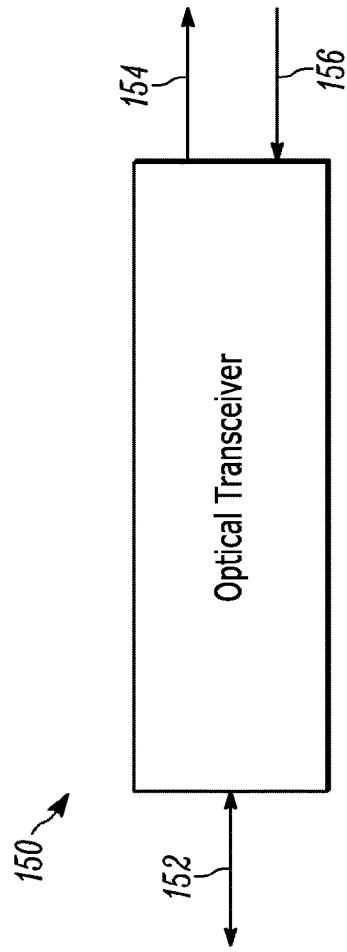
FIG. 1D illustrates a block diagram of one embodiment of a hardware-configured optical element comprising an optical transceiver.

In some embodiments, the optical carrier comprises a client data signal generated by an optical transceiver element upstream of the hardware configured optical element 140. In other embodiments, the optical carrier comprises amplified spontaneous emission from an upstream optical amplifier. FIG. 1D illustrates a block diagram of one embodiment of a hardware-configured optical element comprising an optical transceiver 150. The optical transceiver 150 includes an electrical control port 152 for sending and receiving electronic command and control information. In some embodiments, the electrical control port 152 is an industry standard I2C interface. In other embodiments, the electrical control port 152 uses a multi-master, multi-slave, serial protocol used for embedded system control. The optical transceiver 150 also includes an output that is optically coupled to a transmit optical fiber 154 and an input that is optically coupled to a receive optical fiber 156 that carries the optical signals to the optical transceiver 150. In both the transmit and the receive optical fibers, the optical signals can include one or both of client data traffic and low-frequency control signals. The client data traffic can include network traffic being sent across a network. The low-frequency control signals can include various types of information used to configure the network elements.

Figure 1E:
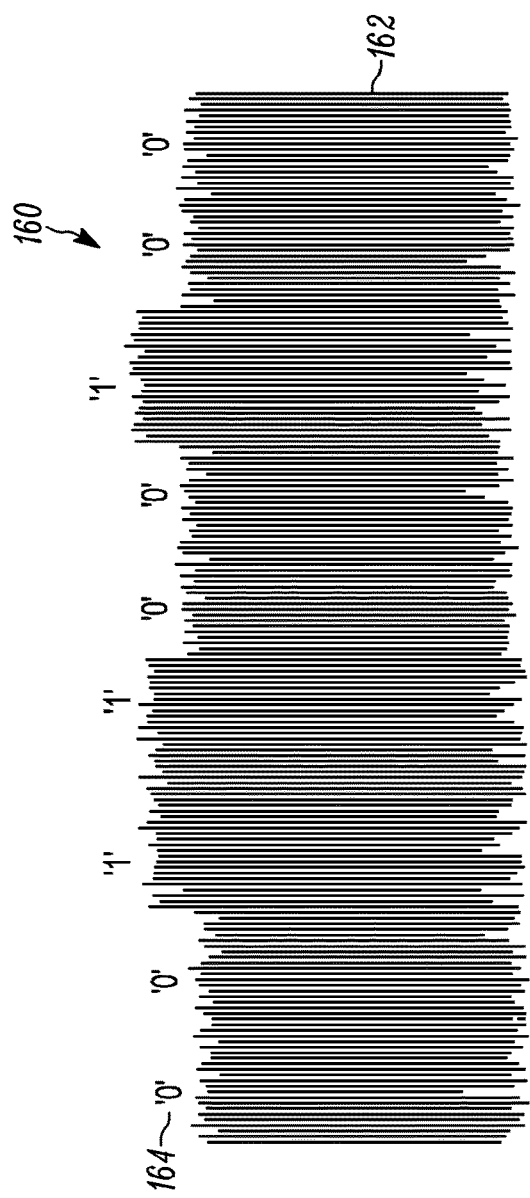
FIG. 1E illustrates an oscilloscope trace of a measured output of the optical transceiver described in connection with FIG. 1D on the transmit fiber.

FIG. 1E illustrates an oscilloscope trace of a measured output 160 of the optical transceiver 150 described in connection with FIG. 1D on the transmit fiber 154. Referring to both FIGS. 1D and 1E, in this embodiment, the optical transceiver 150 generates client data traffic 162 at 10 Gb/s data rate. The client data traffic 162 appears as high and low data levels as a function of time on a relatively long time scale.

Thus, one aspect of the present teaching is to encode control signals 164 using a series of '1's and '0's at a low frequency imposed directly on the optical communications signal emerging from the transceiver 100. In the embodiment shown in FIGS. 1D, 1E, the control signals 164 are imposed directly on the client data traffic 162 generated by the transceiver 150. In various embodiments, the low frequency "1"s and "0"s can be decoded at a corresponding receiving optical element (not shown) optically coupled to the transmit fiber 154. The low frequency modulation may be amplitude modulation as shown in FIG. 1E. In various other embodiments, the low frequency modulation can be any modulation format, such as phase modulation or frequency modulation.

It is important to note that the client data traffic 162 is not affected by the low frequency modulation. One advantage of encoding control signals using a series of "1"s and "0"s at a low frequency 164 imposed directly on the optical signal emerging from the transceiver 150 is that the frequencies used for the low-frequency modulation are typically not passed through the electrical filters in the receivers that decode the high-data rate of the client data traffic 162. Depending on the details of the modulation, scrambling and coding of the optical signal, baseline wander may set the low-frequency cut-off of these high-pass electrical filters to as low as 100 kHz. Consequently, the frequency of the low-frequency control signal is selected to be below the lowest frequency of the high-pass filtering used in the transceiver, and thus the low-frequency control signal will not impact the integrity of the client data traffic 162. Furthermore, the low-frequency-modulation-based encoding and decoding can be accomplished using relatively low cost, low bandwidth optics and electronics that are well known in the art and widely available. Some embodiments of the hardware configured network according to the present teaching use optical and electrical components already available in the transceiver 150 elements currently deployed.

FIG. 2A illustrates a block diagram 200 of one embodiment of a hardware-configured optical element comprising an optical transceiver with a tunable transmitter 202. The tunable transmitter 202 includes an electrical control port 204 for sending and receiving command and control information. In some embodiments, the electrical control port 204 is an industry standard I2C interface. In other embodiments, the electrical control port 204 uses a multi-master, multi-slave serial protocol used for embedded system control. The tunable transceiver 202 includes an output that is optically coupled to a transmit fiber 206.

Figure 2B:
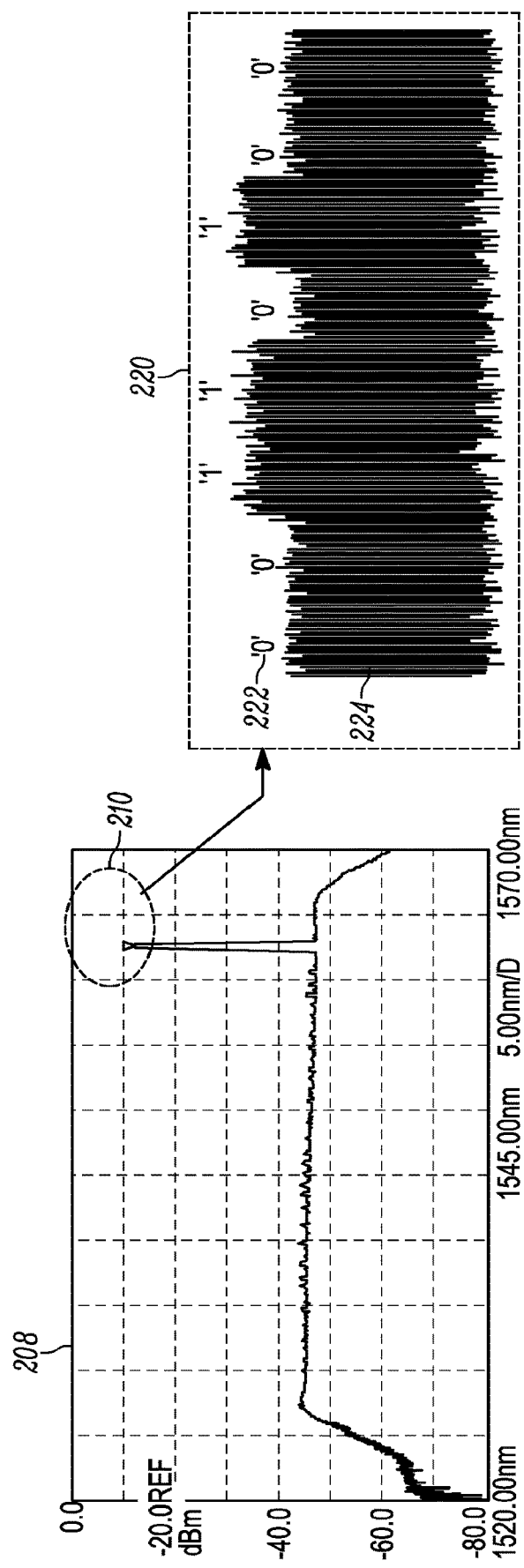
FIG. 2B illustrates an optical spectrum representing the measured output of a tunable transceiver on the transmit fiber according to the present teaching.

FIG. 2B illustrates an optical spectrum 208 representing the measured output of a tunable transceiver on the transmit fiber 206 according to the present teaching. The optical spectrum 208 indicates that the tunable laser in the tunable transceiver 202 is set to a particular wavelength 210. In one particular embodiment, the tunable transceiver 202 wavelength or channel can be set and adjusted across a wavelength range from 1528 nm to 1567 nm.

Referring to both FIGS. 2A and 2B, in this embodiment, the optical transceiver 200 is generating client data traffic 224 at a 10 Gb/s data rate, which is shown as high and low data levels as a function of time with a relatively long time scale of the oscilloscope trace. The control and management information for configuring the network is encoded as a series of '1's and '0's 222 at a low frequency imposed directly on the client data traffic 224. In some methods of operation according to the present teaching, the typical output power for the tunable transceiver 202 is in the 0-3 dbm range, which corresponds to about 1-2 mW. Also, in some methods of operation the low-frequency encoded modulation format is a low frequency power variation of the tunable laser channel, thus operating at the wavelength of the laser channel set point. In addition, in some methods of operation, the modulation depth of the low-frequency modulation is between about 0.5% and 10%. In some embodiments the low frequency modulation is 5% or below.

Thus, one feature of the hardware configured network according to the present teaching is that the control information is encoded on a tunable transmitter signal so the wavelength carrying the encoded control information is tunable based on the tuning configuration of the tunable transmitter. Consequently, by tuning the wavelength of the signal carrying the encoded information, the destination of the encoded control information can be changed based on the particular wavelength paths that are configured in the optical network. For example, the configurations of the wavelength switches, filters, and amplifiers that comprise the optical network establish wavelength paths from source to destination in an optical network. The wavelength paths from various sources to various destinations may also change based on reconfigurations of network elements. The source wavelength may be tuned to follow a desired wavelength path to a particular destination or set of destinations, and, therefore, a low-frequency control signal imposed on the optical signal at that source wavelength will provide encoded control information to that particular destination or set of destinations. The destination of the low frequency control signal, therefore, can be changed by simply tuning the laser wavelength of the tunable transceiver. This ability to select the wavelength carrying the low-frequency modulated control signal allows the encoded control information from one network element to potentially reach any of various different elements in the network by selecting the particular wavelength path.

Another feature of the hardware configured network according to the present teaching is that the low-frequency encoding of the control signal on a particular wavelength has no effect on other wavelengths propagating in the optical fiber or in the entire optical network.

Figure 3A:
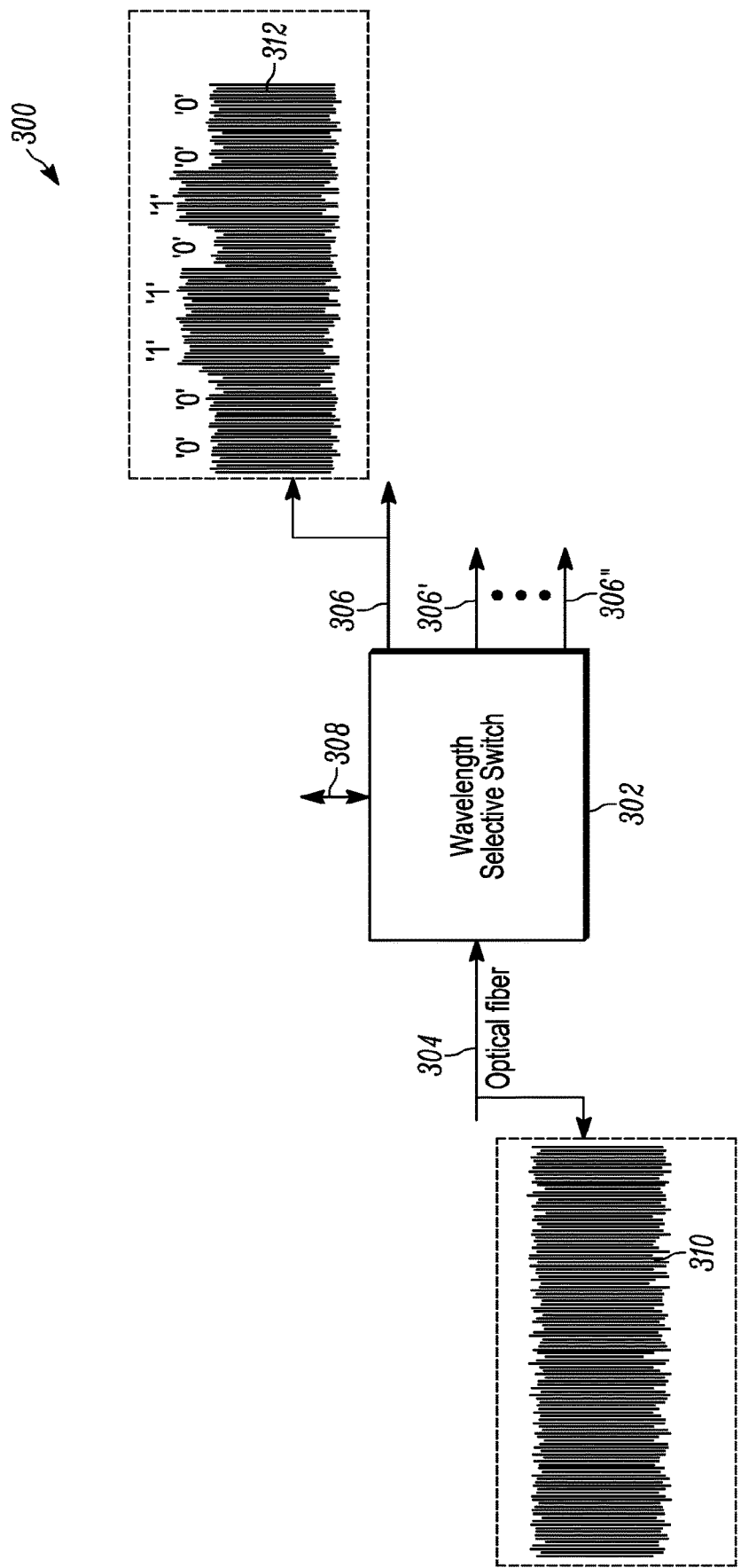
FIG. 3A illustrates a hardware-configured network element according to the present teaching that includes a wavelength selective switch.

FIG. 3A illustrates a hardware-configured optical element 300 according to the present teaching that includes a wavelength selective switch 302. In some embodiments according to the present teaching, the wavelength selective switch 302 is a standard commercially available wavelength selective switch 302 with no special modifications. Wavelength selective switches are widely available in a range of port configurations and channel plans, and are currently being used in state-of-the-art optical networks. Wavelength selective switches, such as the wavelength selective switch manufactured by Finisar Corporation, provide a highly programmable and flexible switching platform that switches traffic from one optical link to another optical link across multiple wavelengths in the same network. However, a wavelength selective switch according to the present teaching can be constructed to have additional features according to the present teaching. In one embodiment of the present teaching, the wavelength selective switch 302 includes one or more low frequency photodiodes for directly detecting encoded control data.

Furthermore, wavelength selective switches used in the hardware configured network according to the present teaching are bi-direction and can operate equivalently in both directions. Thus, one aspect of the present teaching is that the wavelength selective switch 302 can also receive and decode control signals from other optical elements in the network as well as transmit and encode control signals intended for other optical elements in the network.

The hardware configured optical element 300 comprises a wavelength selective switch 302 with at least one optical input that is optically connected to receive optical fiber 304 and a plurality of optical outputs that are optically connected to a plurality of transmit optical fibers 306, 306', 306". The wavelength selective switch 302 also has an electrical control port 308. In some methods of operation according to the present teaching, the receive optical fiber 304 propagates optical signals on one or a plurality of wavelengths. Referring back to FIGS. 2A, 2B, the optical signals may include client data traffic originating from a tunable optical transceiver 202.

FIG. 3A illustrates client data traffic 310 on the receive fiber 304. One function commonly performed by the wavelength selective switch 302 is changing attenuation of received light signals in response to electronic control signals, and generating an amplitude modulated signal from that changing attenuation. The result is a low frequency modulation imposed on the optical signals that are received on the optical inputs of the wavelength selective switch 302 that can be independently imposed on the optical signals at any or all of the wavelengths or channels passing through the wavelength selective switch 302.

FIG. 3A also illustrates the client data traffic 310 with a low frequency control signal 312 in the form of a series of '1's and '0's encoded by the electronic control signals. Note that the integrity of the client data traffic 310 is not affected by the low frequency control signal. The low frequency control signal is imposed selectively on the desired wavelength channels that are routed to any of the plurality of transmit fibers 306, 306', 306" using an electronic control signal that selectively controls the attenuation of particular wavelength channels of the wavelength selective switch 302.

Figure 3B:
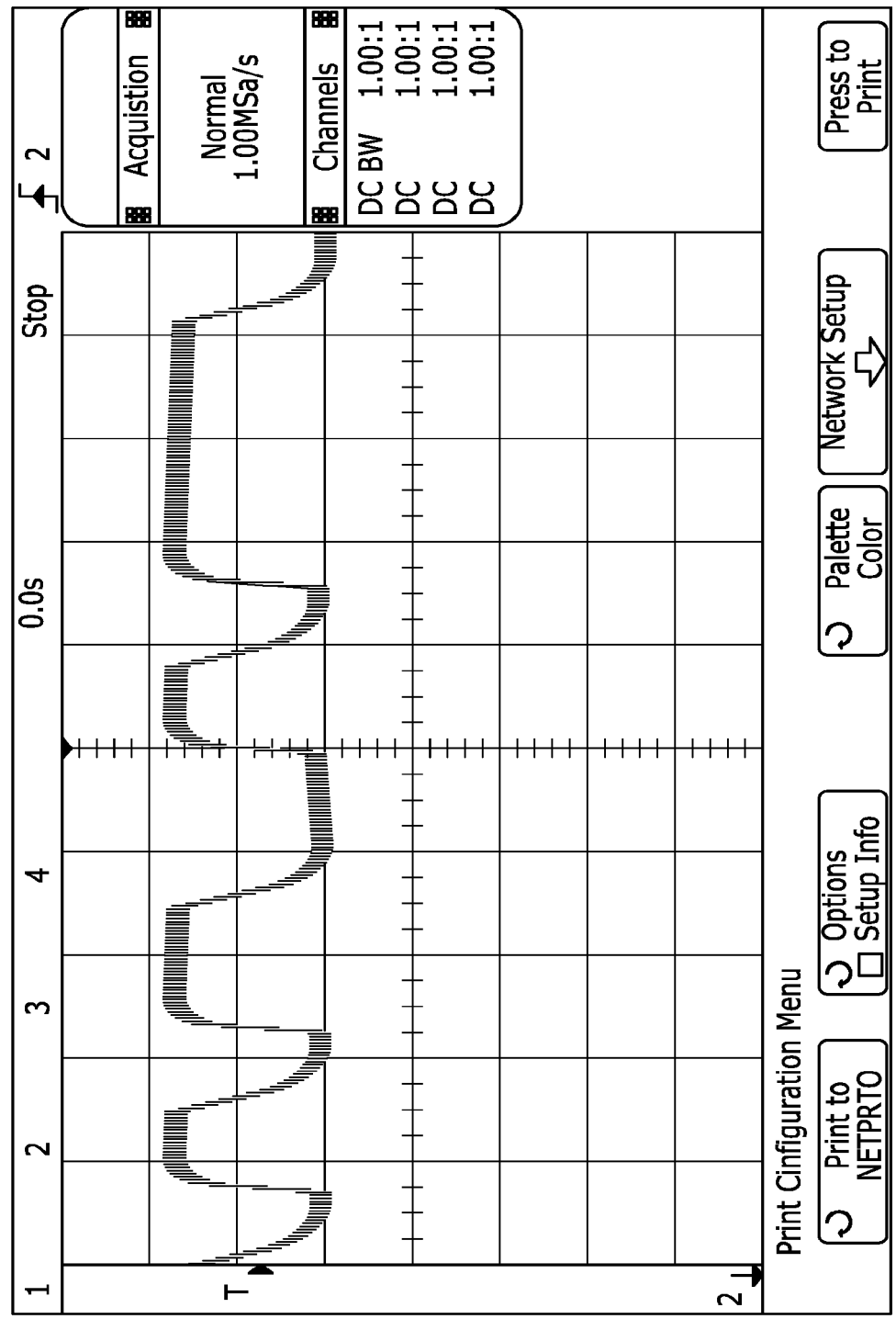
FIG. 3B shows an oscilloscope trace of a measured output of the wavelength selective switch illustrating a low-frequency control signal according to the present teaching.

The low frequency control signal in the form of a series of '1's and '0's 312 generated by the wavelength selective switch 302 can be filtered to eliminate the high frequency signal from the client data traffic, as shown in the oscilloscope trace 350 illustrated in FIG. 3B. FIG. 3B shows an oscilloscope trace 350 of the measured output of the wavelength selective switch 302 on the receive fiber 306 with the client data traffic filtered according to the present teaching. The result is a first signal level for the '1's resulting from low attenuation through the wavelength selective switch 302 and a second lower signal level for the '0's resulting from higher attenuation through the wavelength selective switch 302. The data rate for the filtered control signal can be relatively low. For example, the data rate of the low frequency control signal can be on the order of about 5 bits/s.

Figure 4:
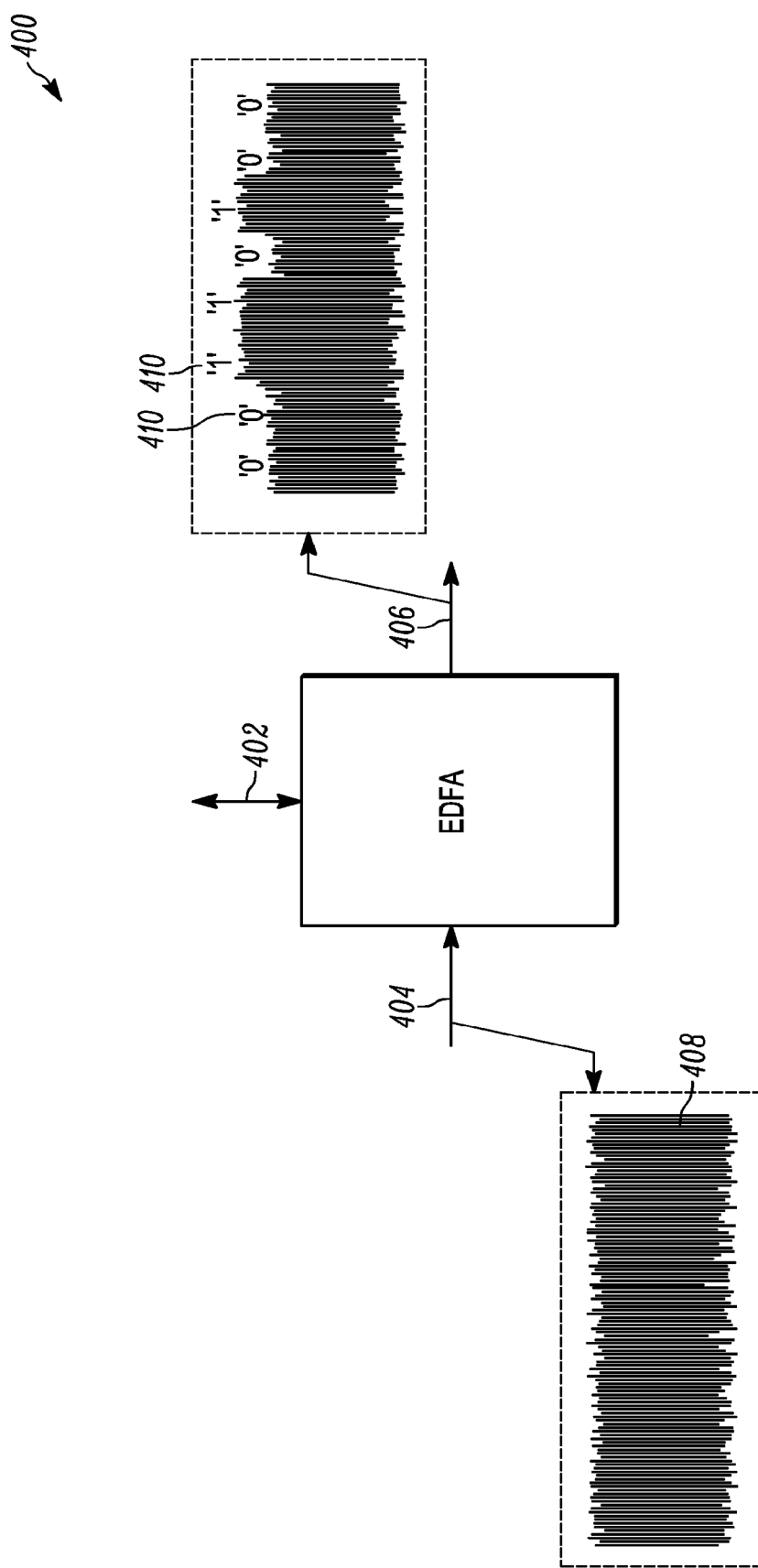
FIG. 4 illustrates a block diagram of one embodiment of a hardware-configured optical element including an optical amplifier according to the present teaching.

FIG. 4 illustrates a block diagram of one embodiment of a hardware-configured optical amplifier 400. In the embodiment shown, the hardware-configured optical amplifier 400 is an erbium-doped fiber amplifier (EDFA), which is a commonly used optical amplifier in modern optical communications systems. One skilled in the art will appreciate that numerous other types of optical amplifiers can be used. The optical amplifier 400 includes an electrical control port 402 configured for sending and receiving electrical command and control information. The optical amplifier 400 also includes an optical input port that is coupled to a receive optical fiber 404 that provides the optical signal to be amplified and an optical output port that is coupled to a transmit optical fiber 406 that transmits the amplified optical signal, which may also include a low-frequency control signal, according to the present teaching.

FIG. 4 also illustrates an oscilloscope trace of input client data traffic 408 provided by the receive fiber 404 to be amplified by the optical amplifier 400. In this embodiment, the client data traffic 408 is modulated at, for example, a 10 Gb/s data rate. The optical amplifier 400 changes the attenuation of the received light signals and generates a low-frequency amplitude modulated control signal 410.

In the embodiment shown in FIG. 4, configuration information is encoded onto the low-frequency modulated control signal using electronic control signals provided by the control port 402. The configuration information data in the low-frequency amplitude modulated control signal 410 is encoded as a series of '1's and '0's using low frequency modulation imposed on the client data traffic 408, as shown in FIG. 4. The integrity of the client data traffic 408 is not affected by the low-frequency amplitude modulated control signals because the amplitude modulation depth of the low frequency modulation is small relative to the modulation depth of the client data traffic. In addition, the integrity of the client data traffic 408 is not affected by the low-frequency amplitude modulated control signals because the frequency of the low-frequency modulation is too low to pass through the receive filters of the client data traffic.

As described herein, one feature of the hardware configured network of the present teaching is that the integrity of the client data traffic 408 is not affected by the small amount of low frequency modulation imparted by the optical amplifier 400. In some embodiments, the amplitude modulation imparted by the optical amplifier 400 provides low frequency modulation to the entire spectral bandwidth of the optical amplifier 400. In other words, all the channels amplified by the optical amplifier experience substantially the same low frequency modulation. In these embodiments, all the channels passing through the optical amplifier 400 receive the same encoded information from an electronic control signal. However, in other embodiments of the present teaching, the optical amplifier 400 has gain control that is capable of controlling the gain for specific channels or bands of channels passing through the optical amplifier 400. In these embodiments, the control signal is encoded on a selection of one or more channels, wavelengths or bands passing through the optical amplifier 400.

One feature of the present teaching is that the low frequency control signals can be imposed on existing optical signals of various types. For the embodiments illustrated in connection with FIGS. 1D-1E and 2, the existing light signal comprises client data traffic that originates from a transceiver element. In some embodiments, the existing light signal comprises no live data traffic. For example, the existing optical signal can include a dummy communication data signal. In other embodiments, the existing optical signal comprises the CW output of an optical transceiver or amplified spontaneous emission from an optical amplifier.

Also, in some embodiments, the existing optical signal originates from the same optical element that imposes the electronic control information on the existing light signal. In other embodiments, the existing optical signal originates from other optical elements upstream from the optical element that imposes the electronic control information on the existing light signal. In some embodiments, the electronic control information from one or more separate elements connected in the network is imposed on the same existing optical signal. In some embodiments, an electronic control port provides the configuration information for the optical control signal. In some embodiments, a processor in the optical network element provides the configuration information for the optical control signal. In some embodiments the configuration information for a transmit optical control signal provided by a processor in the optical network element is generated based on a received optical control signal.

In one embodiment of the present teaching, the hardware configured optical element comprises a counter-propagating Raman pump unit and a variable gain (VG) optical amplifier, such as a variable gain EDFA optical amplifier. The Raman pump unit and variable gain optical amplifier can be integrated to provide very low noise figure and excellent gain flatness, which are to characteristics that are highly desirable for ultra-long haul optical communications systems. State-of-the-art optical amplifier modules can currently support up to three Raman/EDFA pump optical amplifiers in various configurations.

In embodiments using Raman pump units and variable gain optical amplifiers, fast automatic gain control (AGC) circuitry can be used to provide a high degree of transient suppression that allows the optical amplifier to keep the gain constant during operating conditions where there are fast and large changes in the input power that are independent of the amplified stimulated emission (ASE) produced by the Raman pump optical amplifier. Suitable variable gain dual-stage erbium-doped fiber amplifiers that provide flattened gain across the C-band with low noise figure and a large dynamic gain range (up to 15 dB) are commercially available from Finisar Corporation. In some embodiments, the optical amplifier includes features such as comprehensive transient control, tunable mid-stage access (MSA) loss, and gain tilting functionality that all may be used, together or separately, to control attenuation through the device to impose the low frequency modulation on the existing optical signals.

One feature of the present teaching is that the hardware configured optical elements provide means for transmitting configuration information to elements in a network that includes numerous hardware-configured optical elements. The methods and apparatus of the present teaching are compatible with existing and deployed optical elements in known networks, and can be readily implemented using known low-frequency modulation techniques and known methods of information processing. Compatible existing networks include industry-standard data communications and telecommunications networks, such as large service provider networks and enterprise networks, as well as private networks and purpose-built network systems, such as those used for industrial control. In some embodiments of the present teaching, the configuration information, or control signal, is exchanged between optical elements in a point-to-point manner. In other embodiments, the configuration information is exchanged between optical elements in a broadcast manner or a multi-cast manner to some or all of the optical elements on the network. In yet other embodiments, the configuration information is exchanged in a multi-point manner or a cascade manner. In various embodiments, any combination of these means for exchanging configuration information or control signal information between optical elements can be used.

Another feature of the hardware configured network comprising the hardware configured optical elements of the present teaching is that known communications protocols and known management information protocols may be used to configure network elements. That is, known systems of rules for collecting information from and configuring network element can be used. These protocols include data communication, telecommunication transport, and management protocols that are used, for example, to manage data format, addressing, routing, error and fault management, flow and sequence control, and other known management elements and functions. In various embodiments, these protocols comprise embedded systems, real-time systems, and computer bus protocols.

Figure 5:
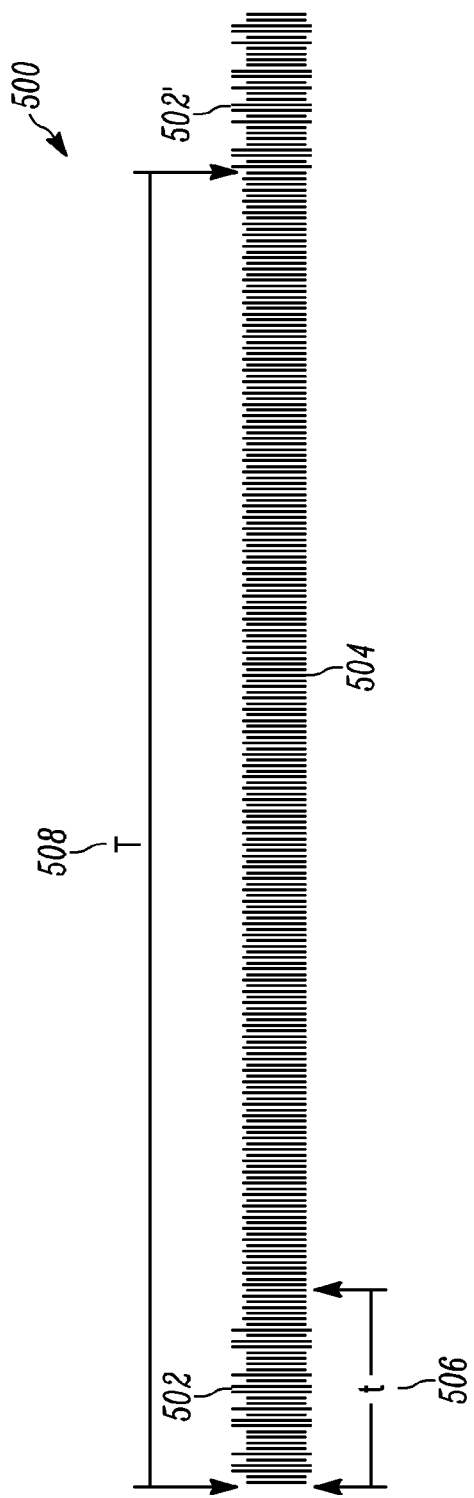
FIG. 5 illustrates an oscilloscope trace of a low frequency control signal according to the present teaching comprising a collision avoidance protocol based on modification to the well-known Ethernet protocol.

FIG. 5 illustrates an oscilloscope trace of a low frequency control signal 500 according to the present teaching comprising a collision avoidance protocol based on modification to the well-known Ethernet protocol. The low frequency control signal 500 shown in FIG. 5 includes a protocol that is suitable for multi-point communication. The encoded control information is transmitted in "bursts", shown as the regions 502, 502', where modulated '1's and '0's appear on the client data traffic 504. The burst duration, shown as time t 506, is small in comparison to the retransmission time T 508. In some embodiments, the ratio of t/T is 0.1, such that the packet time is only 10% of the retransmission time. Each transceiver utilizes a random percent of the retransmission time for the packet burst in order to avoid potential collisions of packets that are sent from different transmitters and improve reliability of decoding at the receiver. In other words, the t/T for various transmitters is randomly chosen.

One aspect of the present teaching is that the optical elements in the hardware configured network can be arranged in any network configuration, including mesh, point-to-point, ring, bus, tree, and other known configurations. Furthermore, the optical elements of the hardware configured networks of the present teaching may include several different element types, including transceivers, amplifiers, optical channel monitors (OCM), wavelength selective switches, WDM multiplexers and WDM demultiplexers, cross connects, and optical switches. Thus, the configuration system of the present teaching supports a large number of network topologies, network sizes and scopes, and network services.

Another aspect of the present teaching is that a heterogeneous combination of optical network elements, including transceivers, amplifiers, optical channel monitors, wavelength selective switches, multiplexers/demultiplexers, cross-connects and optical switches can be configured with a common configuration scheme, as described herein.

Figure 6:
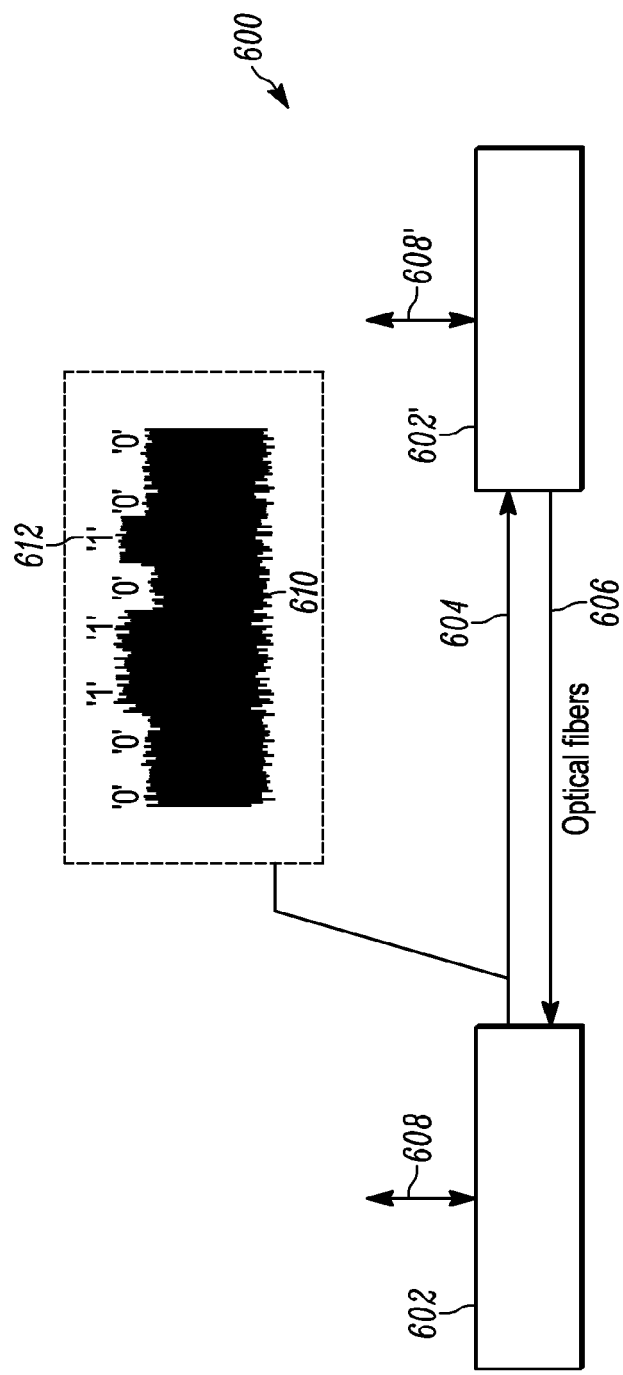
FIG. 6 illustrates an embodiment of a hardware-configured network of the present teaching in a point-to-point transceiver topology, sometimes referred to in the art as an optical link.

FIG. 6 illustrates an embodiment of a hardware-configured network of the present teaching in a point-to-point transceiver topology, sometimes referred to in the art as an optical link. The point-to-point configuration shown in FIG. 6 can be extended to other, more complex network topologies that include additional optical transceiver elements, such as mesh, ring, and bus. In the embodiment illustrated in FIG. 6, two optical transceivers 602, 602' are connected via one optical fiber 604 for transmitting from the first transceiver 602 to the second transceiver 602'. A second optical fiber 606 transmits information from the second transceiver 602' to the first transceiver 602.

The transceivers 602 comprise control ports 608, 608' for sending and receiving command and control information signals. An oscilloscope trace 609 of the measured output of the first transceiver 602 shows the normal client data traffic 610 at a 10 Gb/s data rate and the low frequency control signal 612. Note that the integrity of the client data traffic 610 is not affected by the low frequency control signal 612. The low frequency control signal 612 shown in FIG. 6 is an amplitude modulated signal, but one skilled in the art will appreciate that any modulation format can be used. The low frequency control signal 612 comprises control and management information sent from the first transceiver 602. A microprocessor in the second optical transceiver 602' is used to decode the series of '1's and '0's received from the first optical transceiver 602. In this way, configuration information is shared from the first optical transceiver 602 to the second optical transceiver 602'.

The second optical fiber 606 is used to send configuration information from the second transceiver 602' to the first transceiver 602. In this way, configuration information is shared from the second optical transceiver 602' to the first optical transceiver 602. The control ports 608, 608' on the first and second transceivers 602, 602' can include an industry standard I2C interface or other type of communication interface. Thus, using the low-frequency modulation method of the current teaching, digital diagnostic information can be encoded, shared, and decoded in both directions between the two transceivers 602, 602'.

Figure 7:
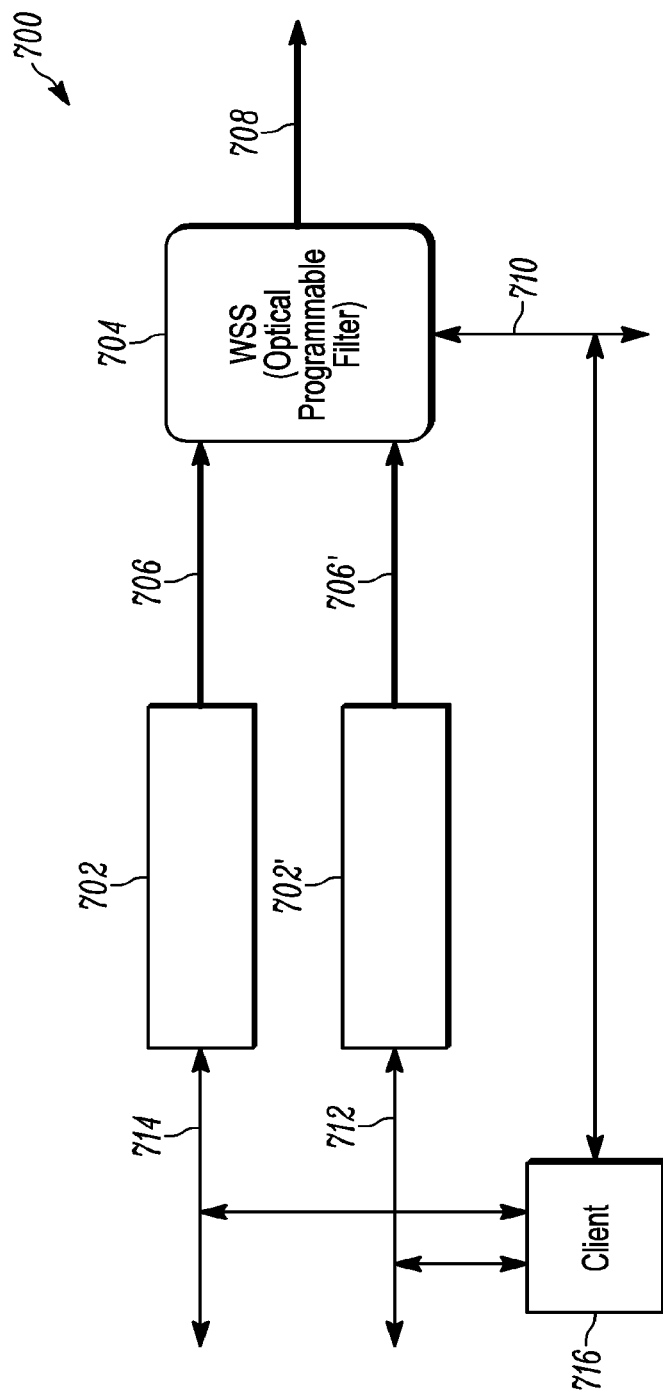
FIG. 7 illustrates an embodiment of a hardware configured network of the present teaching comprising multiple tunable transceivers connected to a wavelength selective switch or to an optical programmable filter element.

FIG. 7 illustrates an embodiment of a hardware configured network 700 of the present teaching comprising multiple tunable optical transceivers 702, 702' connected to a wavelength selective switch or to an optical programmable filter element 704. The wavelength selective switch can be used to route optical signals between optical fibers based on a particular wavelength or channel. A wavelength selective switch can be configured as a reconfigurable optical add drop multiplexer and functions as an automated patch panel that shifts wavelengths and bandwidth quickly to different fibers. For example, Flexgrid™ technology products, commercially available from Finisar Corporation, provide dynamic control of the channel center frequency with 6.25 GHz resolution and a channel width resolution of 12.5 GHz within a wavelength selective switch. With Flexgrid™ technology, once deployed, channel plans are configurable "on-the-fly," meaning that channel bandwidths can be adjusted to most efficiently carry future demands as they arise, or for any other purpose.

One example of a state-of-the-art programmable optical filter is the WaveShaper family of programmable optical processors, which is commercially available from Finisar corporation.

Programmable optical filters provide a range of programmable optical filtering and switching, including extremely fine control of filter characteristics, such as center wavelength, bandwidth, shape and dispersion, and attenuation. A programmable optical filter can provide functions such as tunable optical filtering, optical bandwidth management, dynamic gain equalization, programmable optical filtering, polarization processing, and multiport optical processing. All these parameters of wavelength selective switches and programmable optical filters can be configured using the hardware configured network method and apparatus of the present teaching.

FIG. 7 illustrates two optical transceivers 702, 702' having optical output that are connected to inputs of the programmable filter element 704 with optical fibers 706, 706'. The optical connections between the two transceivers 702, 702' and the programmable filter element 704 are bi-directional in many configurations. The programmable filter element 704 includes an output that is optically connected to an output fiber 708 and an electronic control port 710 that receives electronic control signals. The two optical transceivers 702, 702' have electronic control ports 712, 714 that receive electronic control signals.

In some embodiments, the optical transceivers 702, 702' are tunable, and are set to transmit and receive different wavelength channels. In the configuration shown in FIG. 7, the programmable filter element 704 is programmed to receive the two wavelength channels and to transmit them on the output fiber 708. One skilled in the art will appreciate that any number of transceivers with any number of channels can be used with the methods and apparatus of the present teaching.

In some embodiments, a local client 716 is used to provide the control information to configure the programmable filter element 704 and to set the wavelength channels from the transceivers 702, 702'. In some embodiments, the control information is provided independently from an external source using the control ports 710, 712, and 714. The control information is encoded onto a low frequency control signal imposed on an existing optical signal that propagates on the optical fibers 706, 706', and 708. In this way, information for element configurations is transferred through the network. Both local-client-based and independent input methods are used in some embodiments. In various embodiments, the local client may or may not be co-located with the optical elements.

Figure 8:
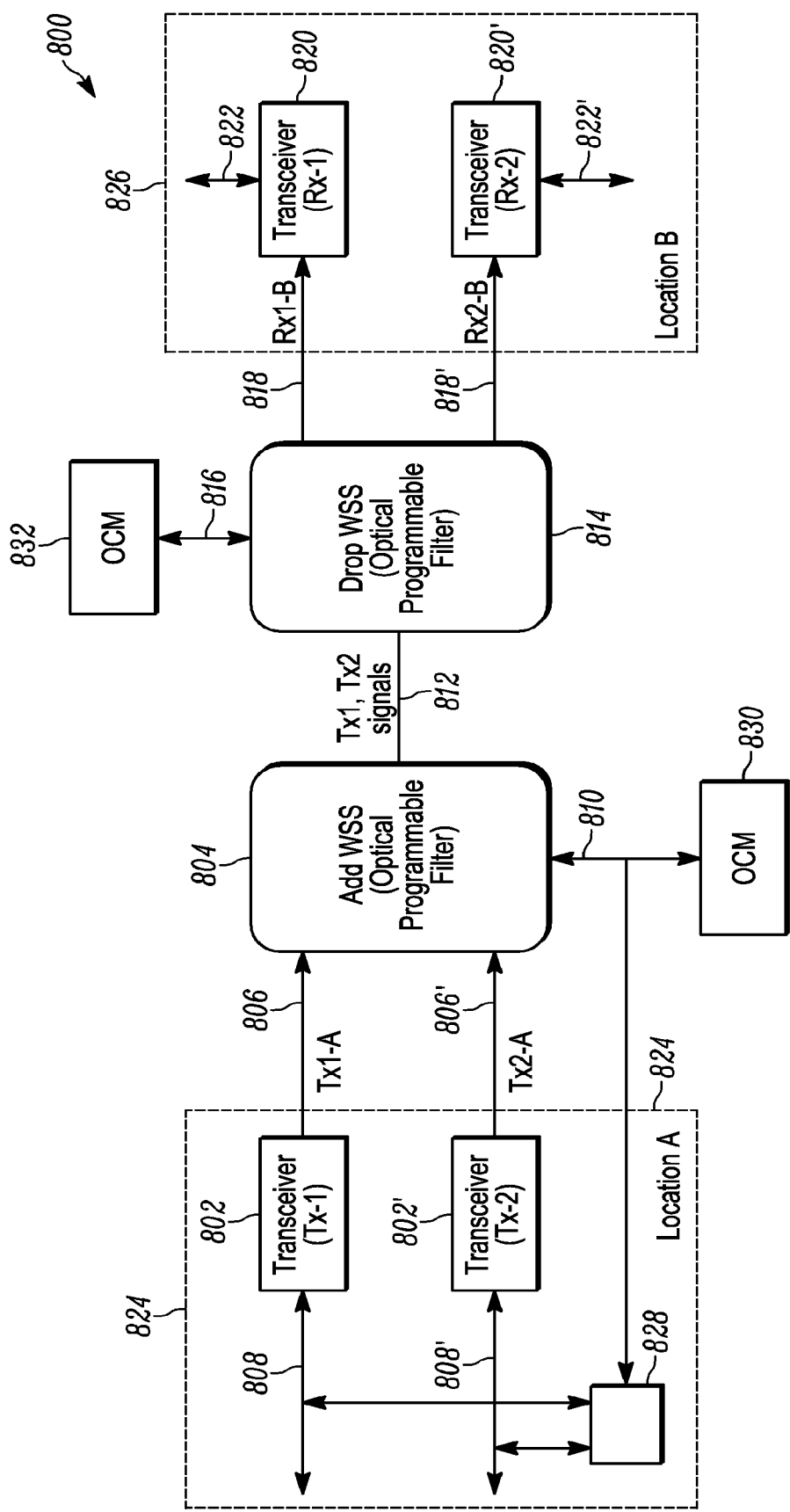
FIG. 8 illustrates an embodiment of the hardware configured network of the present teaching comprising a wavelength division multiplexed network with wavelength selective switched optical elements.

FIG. 8 illustrates an embodiment of the hardware configured network 800 of the present teaching comprising a wavelength division multiplexed network with wavelength selective switched optical elements. Many known network element configurations rely on the use of a client to communicate the configuration information to the various elements in the wavelength division multiplexed network using a separate "supervisory" channel. One feature of the hardware configured networks of the present teaching is that the known client hardware is no longer necessary to provide element configuration. Client hardware and other external management systems can be present and used in the network, but they are no longer necessary for element configuration. Also, if these client hardware and other external management systems are used, they can have a greatly reduced role. Instead, configuration information is provided via a low-frequency control signal imposed on an existing optical signal in the optical network, as described herein.

FIG. 8 illustrates a first and second transceivers 802, 802' having bi-directional optical ports that are optically coupled to an add wavelength selective switch 804 with optical fibers 806, 806'. In some embodiments, there is bi-directional communications between the first and second transceivers 802, 802' and the add wavelength selective switch 804. In other embodiments, there is only one-way communications from the first and second transceivers 802, 802' to the add wavelength selective switch 804. The transceivers 802, 802' also include control ports 808, 808' that receive control information.

The add wavelength selective switch 804 has an electrical control port 810 that receives control information. In some embodiments, the electrical control port 810 is not used, and the control information is provided via the optical fibers 806, 806'. In addition, the add wavelength selective switch 804 includes an optical bi-directional port that is optically coupled to a bi-directional port of the drop wavelength selective switch 814 with the optical fiber 812. The drop wavelength selective switch 814 has an electrical control port 816 that receives control information. In operation, the add wavelength selective switch 804 can be configured to connect various wavelengths from various input ports to a particular output port in a controllable way. The drop wavelength selective switch 814 can also be configured to connect various wavelengths from a particular input port to one or more of various output ports in a controllable way. One skilled in the art will appreciate that the add wavelength selective switch 804 and the drop wavelength selective switch 814 can also operate in the reverse direction so that the add wavelength selective switch 804 becomes a drop wavelength selective switch, and vice versa.

The drop wavelength selective switch 814 also includes two bi-directional ports that are optically coupled to a first and a second optical fiber 818, 818'. In the embodiments shown, the optical fibers 818, 818' transmit optical signals from the drop wavelength selective switch 814 to transceivers 820, 820'. The transceivers 820, 820' have electrical control ports 822, 822'. In the embodiment shown in FIG. 8, the transceiver 802, 802' transmit through the add wavelength selective switch 804 to the drop wavelength selective switch 814 to the transceivers 820, 820' that receive the signal.

In the embodiment illustrated in FIG. 8, the transceiver 802 at location A 824 is in a transmit mode and is optically coupled to transceiver 820, which is in a receive mode at location B 826. Similarly, the transceiver 802' at location A 824 is in a transmit mode and is connected to transceiver 820' at location B 826, which is in a receive mode. In one method of operation, the transceiver 802 is at least partially configured using a client configuration device 828 to provide data on a particular wavelength channel.

Encoded control information is imposed using low-frequency modulation on the wavelength channel originating from transceiver 802 that is sent to the add wavelength selective switch 804. The encoded control information is received by add wavelength selective switch 804 and then decoded and used to configure the add wavelength selective switch 804 to pass the signal from transceiver 802 to the output fiber 812 that is connected to drop wavelength selective switch 814. This action causes the control signal to pass to the drop wavelength selective switch 814, where it is subsequently decoded. The drop wavelength selective switch 814 then uses the decoded control information to configure the drop wavelength selective switch 814 to pass the signal from transceiver 802 to the fiber 818. This configuration of drop wavelength selective switch 814 thereby passes the signal and encoded control information originating from transceiver 802 to receiver 820. The encoded control information is received at transceiver 820, and is used to configure the transceiver 820 to receive signal data from transceiver 802.

In some embodiments, one or more optical channel monitors 830, 832, provide control information to the hardware-configurable add and drop wavelength switches 804, 814. The optical channel monitors 830, 832 monitor the details of the optical signals passing through the add wavelength selective switch 804 or drop wavelength selective switch 814, or both, and use that information to inform various control actions of the hardware configured network. The control actions are signaled to the network via the low-frequency modulation described herein.

One skilled in the art will appreciate that the add wavelength selective switch 804 and the drop wavelength selective switch 814 are capable of running traffic simultaneously in both the forward and the reverse direction. However, two optical fibers between each element are required for propagating traffic in both directions.

One skilled in the art will appreciate that the particular sequence of events showing automated configuration and provisioning use of the hardware configured network shown in FIG. 8 is illustrative, and does not limit the present teaching in any way. For example, various protocols can be used to establish network connectivity and network configurations amongst the optical elements in various sequences using the low frequency control signals described herein. Also, a client can be used to provide the electronic control signal to any of the elements in the network for any or all of the configuration events. In addition, the client can be used to initiate one or more configuration events, and the automated encoded information is used for the remainder of the configuration events.

One aspect of the present teaching is that installation errors can be detected in an automated fashion without the use of clients or external network managers. Installation errors cause actual deployed hardware physical connections to deviate from planned hardware physical connections. The term "physical connection" is referred to herein as a connection of a particular port of one or more optical elements to particular fibers or to particular ports on optical elements. When installation errors occur, planned element configurations that are pre-programmed into optical elements presuming planned hardware physical connections will not result in proper optical signal paths amongst elements. In known configuration systems, the only way to recover from installation errors is to use expensive human intervention to both detect the erroneous connections and to also re-deploy the hardware to establish the planned hardware physical connections.

Figure 9:
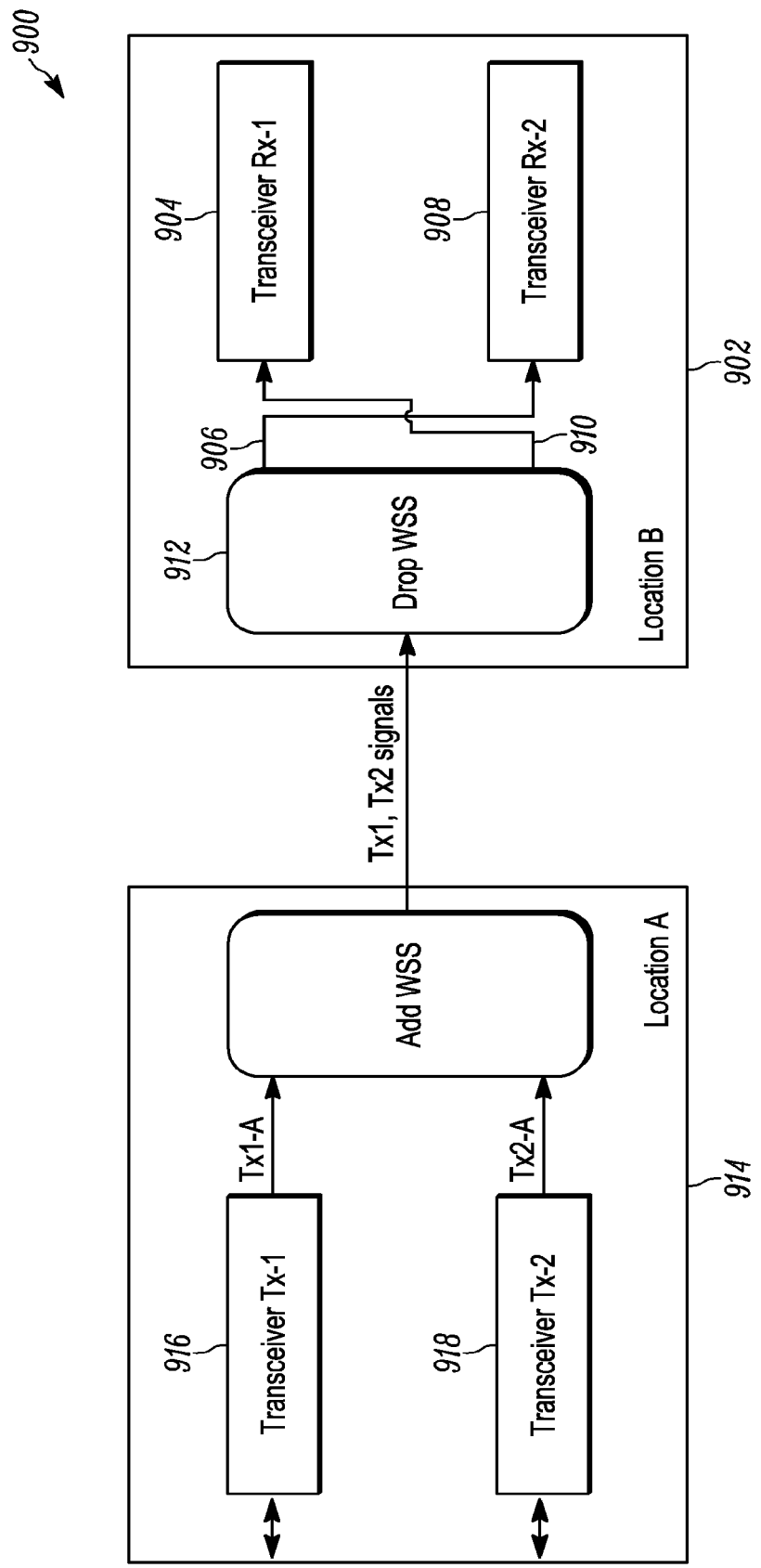
FIG. 9 illustrates the hardware configured network of FIG. 8 in which the wiring is incorrectly installed.

FIG. 9 illustrates the hardware configured network 900 of FIG. 8 in which an installation error causes a crossed wiring condition in location B 902. The planned wiring connection calls for receiving transceiver RX-1 904 to be connected with optical fiber 906 and receiving transceiver RX-2 908 to be connected with optical fiber 910. The installer error results in the receiving transceiver RX-1 904 being connected with the optical fiber 910 and receiving transceiver RX-2 908 being connected with optical fiber 906, as shown in FIG. 9. Such installation errors are unfortunately a common occurrence for telecommunications service providers, and cause significant service turn-up delays and added cost. The crossed wiring condition is both difficult to detect and difficult to correct, even with state-of-the-art network hardware configuration systems. Detecting the installation error condition requires correlation of error conditions from multiple network elements using human operators, as well as subsequent service calls by field technicians to locate and reconnect the equipment to the planned physical connections.

Using the hardware configured network apparatus and method of the present teaching, the cross-wired installation error of FIG. 9 can be automatically detected and corrected with virtually no human intervention or truck rolls. Specifically, at start up, the drop wavelength selective switch 912 sends an optical signal including low-frequency control signal according to the present teaching from the transmit transceiver TX-1 916 at location A 914 to the receiving transceiver RX-2 908 at location B 902. The receiving transceiver RX-2 908 at location B 902 identifies the connection error because the encoded configuration information on the low-frequency control signal is from TX-1 916 at location A 914 and not from TX-2 918 at location A 914, as expected. Receiving transceiver RX-2 908 at location B 902 then initiates corrective action by encoding corrective configuration information on a low-frequency control signal directed to the appropriate network elements in order to provide corrective action mitigating the installation error.

In particular, the wiring error is corrected using a reconfiguration of the drop wavelength selective switch 912. Reconfiguration is initiated by encoded information sent from receiving transceiver RX-2 908 at location B 902 to the drop wavelength selective switch 912 at location B 902 to reconfigure the drop channels such that RX-2 908 at location B 902 receives the optical signals from TX-2 918 at location A 914. Thus, drop wavelength selective switch 912 is reconfigured based on control information sent from receiving transceiver RX-2 908 such that signals from TX-1 916 at location A 914 emerge on deployed fiber 910, rather than the planned fiber 906, and signals from TX-2 918 at location A 914 emerge on deployed fiber 906, rather than the planned fiber 908. In this way, a reconfiguration of optical elements in the hardware-configured network of the present teaching corrects the installation error with no expensive human intervention. Extension to other installation errors and requisite reconfiguration steps are well understood by those familiar with the state of the art in network configuration and fault recovery.

Figure 10:
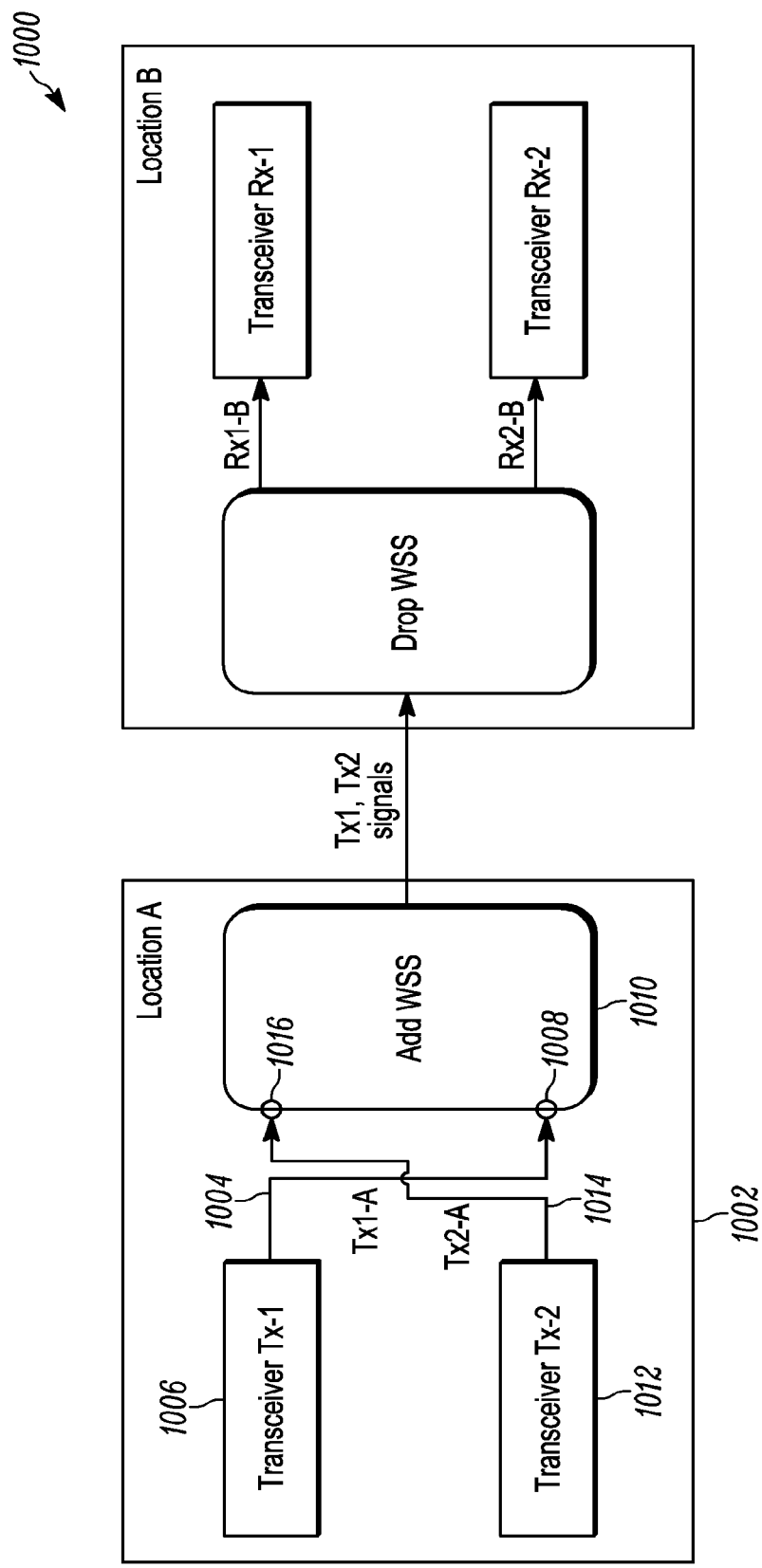
FIG. 10 illustrates an embodiment of the hardware configured WDM network of FIG. 8 in which the installer makes a mistake wiring the elements in location A.

One aspect of the present teaching is the ability to catch installation errors early at the transmit side of the network, rather than detecting configuration errors only when the signal arrives at the receive end of the network, as is currently done in known systems. FIG. 10 illustrates an embodiment of the hardware configured wavelength division multiplexed network 1000 of FIG. 8 in which the installer makes a mistake wiring the elements in location A 1002. Specifically, the fiber 1004 originating from transmitting transceiver TX-1 1006 is connected to an input 1008 on add wavelength selective switch 1010 that was actually planned for the fiber transmitting receiver TX-2 1012. Also the fiber 1014 originating from transmitting transceiver TX-2 1012 is connected to the input 1016 on add wavelength selective switch 1010 that was planned for transmitting receiver TX-1 1006. Stated another way, the connections from the transceivers 1006, 1012 to the add wavelength selective switch 1010 are swapped on the inputs 1008, 1016 with respect to the planned deployment because of the installation error. In this erroneous configuration, the add wavelength selective switch 1010, which is configured at start-up to route signals that appear on input 1016 from transmitting transceiver TX-1 1006, instead receives signals from transceiver TX-2 1012 on that port 1016. The encoded configuring information provided on the low-frequency control signal detected by the add wavelength selective switch 1010 causes this error to be detected immediately within the add wavelength selective switch 1010. In some methods of operation, the error can be remediated by having the hardware configured network notify the client or third party manager that the wiring needs to be fixed. In other automatic method of operation, the hardware configured network automatically reconfigures the transceivers 1006, 1012, or automatically reconfigures the add wavelength selective switch 1010. The automatic reconfiguration is initiated based on control information sent to the optical element that can be reconfigured to remediate the error from the optical element that detected the error.

Figure 11:
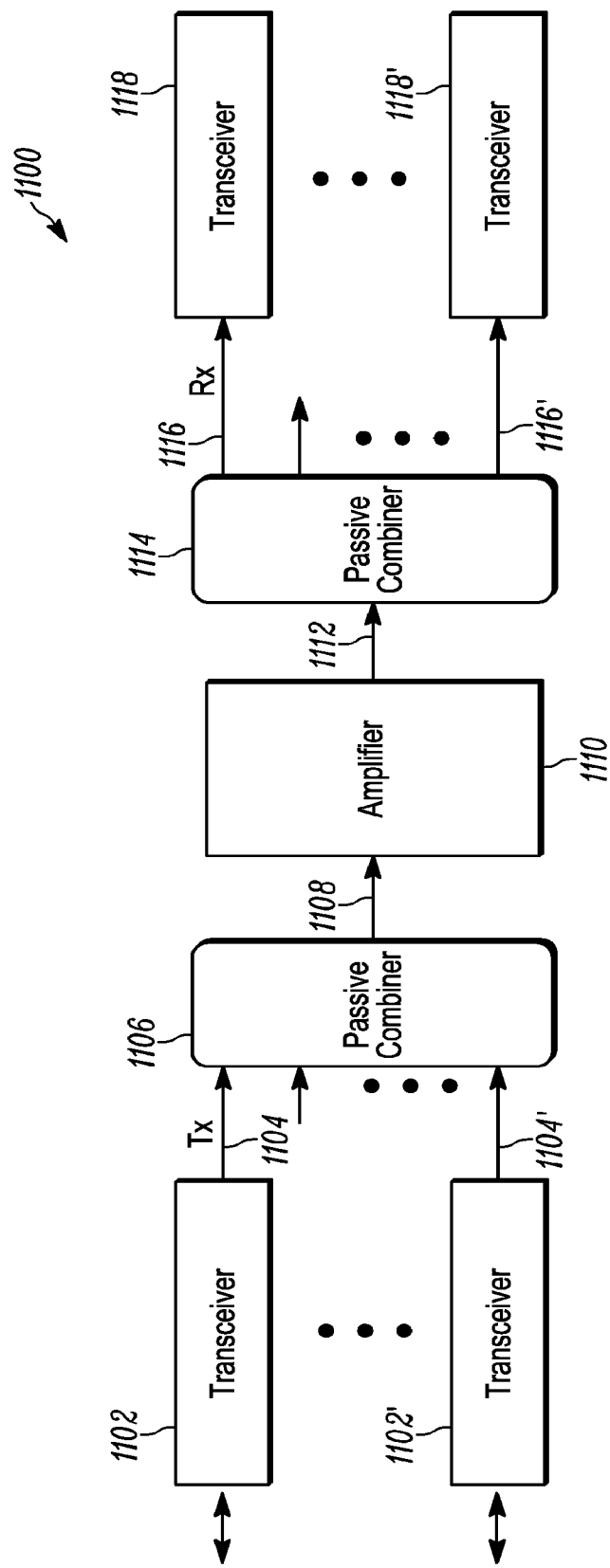
FIG. 11 illustrates an embodiment of a low-cost combiner-splitter comprising hardware-configured elements according to the present teaching.

One aspect of the present teaching is the ability to provide a low-cost multi-transceiver combiner-splitter. FIG. 11 illustrates an embodiment of a low-cost combiner-splitter 1100 comprising hardware-configured elements according to the present teaching. Multiple transceivers 1102, 1102' are connected to a passive combiner 1106 using a plurality of optical fibers 1104, 1104'. The passive combiner 1106 can include any number of ports. For example, the passive combiner 1106 can be a sixteen-port (16:1) passive combiner.

The output of the passive combiner 1106 is optically coupled to an optical amplifier 1110 with an optical fiber 1108. The optical amplifier 1110 is used to overcome the loss of the combiner 1106, which is approximately 13 dB for a 16:1 combiner. The optical amplifier 1110 can be a low-cost erbium-doped fiber amplifier, which is widely available. For example, in one embodiment, the optical amplifier 1110 has a launch power of 0 dBm for each transceiver 1102, 1102', and sufficient amplifier gain to overcome the combiner loss, such that the output power from the amplifier 1110 is 12 dBm. The output of the optical amplifier 1110 is optically coupled to an optical splitter-combiner 1114 with an optical fiber 1112. The optical splitter-combiner 1114 includes a plurality of optical outputs 1116, 1116' that are optically coupled to a plurality of transceivers 1118, 1118'.

In various embodiments, the transceivers 1102, 1102' and transceivers 1118, 1118' operate in either a transmit or a receive mode. For example, in one method of operation, the transceivers 1102, 1102' operate in the transmit mode and the transceivers 1118, 1118' operate in the receive mode. In another method of operation, the transceivers 1102, 1102' operate in the receive mode and the transceivers 1118, 1118' operate in the transmit mode.

Some or all of the transceivers 1102, 1102', transceivers 1118, 1118', and amplifier 1110 are configured using the low-frequency modulation described herein. One feature of the hardware configured network of the present teaching is that there is no need to keep track of fiber order or mark specific transceiver connections, because all the configuration information can be provided by the low-frequency control signals. The configuration information allows the automatic provisioning of tunable channels and establishes all data connections between transceivers.

One aspect of the present teaching is that the hardware configured network described herein can provide digital diagnostics for optical network elements. Known transceivers sometimes include a microprocessor and diagnostics interface that provides performance information on the data link. This allows users to remotely monitor, in real-time, numerous performance parameters, such as received optical power, transmitted optical power, laser bias current, transceiver input voltage, and transceiver temperature of any transceiver in the network. Digital diagnostic functions provide users, clients, and external network management systems with a tool for implementing performance monitoring.

Some known optical transceivers provide digital diagnostics via a digital diagnostic monitoring interface (DDMI). The digital diagnostic monitoring interface specifies the control information that is passed to the client or external management systems and includes such information as element identifying information, element operating parameters, network and element configuration information, alarms and warning parameters, as well as vendor information. The digital diagnostic monitoring interface for small form factor (SFP) optical transceivers is detailed in Finisar Corporation Application Note AN-2030 "Digital Diagnostic Monitoring Interface for Optical Transceivers".

Known digital diagnostic monitoring interfaces comprise an interface device, or optical transceiver, that allows real-time access to device operating parameters, as well as alarms and warning flags that alert users when operating parameters are out of normal range. Known digital diagnostic monitoring interface devices generate the diagnostic data by digitization of internally monitored analog signals. Calibration and alarm threshold data is typically written during interface device manufacture. In addition to generating digital readings of internal analog values, known digital diagnostic monitoring interface devices generate various status bits based on comparison with current values and factory preset values. Also, known digital diagnostic monitoring interface devices generate identifier information.

Another aspect of the hardware configured networks of the present teaching is to provide enhanced digital diagnostic monitoring. Some embodiments of the hardware configured networks of the present teaching provide digital diagnostic monitoring interface control information as part of the low frequency control signal described herein. In particular, the low frequency control information can include data fields that are part of the low frequency control signal described herein, and that provide specific information on the transmitter component of a transceiver element. For example, the low frequency information signal can include one or more transmitter serial numbers for a transceiver element comprising a transmitter and/or transmitter channel identification numbers particular transceiver elements. The transmitter channel identification numbers provides the wavelength and/or channel number to which the laser transmitter is tuned. The low frequency information signal described herein can also include information on the receiver component of a transceiver element. For example, the low frequency information signal can include one or more receiver serial number for transceiver elements comprising a receiver and/or the receiver channel identification numbers for particular transceiver elements.

Another aspect of the hardware configured networks of the present teaching is that it can provide enhanced digital diagnostics by exchanging configuration information with elements such as transceivers, amplifiers, wavelength filters, optical channel monitors, wavelength selective switches, wavelength multiplexers, wavelength demultiplexers, cross connects, and optical switches. The enhanced digital diagnostic information is used as the control information encoded on the optical control signals of the present teaching. Using the optical control signals of the present teaching provides additional flexibility in the ability to reach various optical elements in a hardware-configured network as compared to prior art configuration systems by selecting the appropriate optical carriers. In some embodiments of the hardware configure network of the present teaching, the hardware configurable elements comprise photodiodes that decode the low frequency control signals described herein.

One skilled in the art will appreciate that hardware configurable elements according to the present teaches can be used for various purposes. For example, in some embodiments, hardware configurable optical amplifiers can be used for network turn-up configuration before transceiver transmitters are active. Also, in some embodiments, hardware configurable amplifiers are configurable to have optical gains that depend on optical path noise calculation. Also, in some embodiments, hardware configurable amplifier gain profiles are adjusted based on channel turn-up from remote transceiver. Also, in some embodiments, hardware configurable amplifiers can transmit information regarding optical gain to transceiver.

Also, in some embodiments, hardware configurable wavelength selective switch ports are configured and reconfigured with flexible channel plans as needed depending up on data traffic. Also, in some embodiments, hardware configurable wavelength selective switches are used to provide network protection from faults by reconfiguring optical paths in the network after failure. Also, in some embodiments, hardware configurable optical programmable filters automatically adjust path dispersion without user or external network management intervention, based on performance information provided by hardware configurable transceiver elements.

Also, in some embodiments, hardware configurable optical channel monitors are calibrated using the low frequency control signals described herein. Referring to FIG. 8, by adding a precision channel monitor 830, 832 and using the enhanced digital diagnostics control information in the hardware configured networks of the present teaching, transceivers used in the network can be tuned and spaced more tightly for higher total optical transfer rates and spectral efficiency.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A transceiver for a hardware configured optical network, the transceiver comprising:
   a) a first optical port that receives an input optical signal from the hardware configured network, the input optical signal comprising client data traffic on a receive optical carrier and receive control information for configuring an optical network element encoded as a modulation on the receive optical carrier having a frequency that is less than a modulation frequency of the client data traffic;
   b) a receiver having an input that is optically coupled to the first optical port, the receiver comprising a photodiode that directly detects the input optical signal, the receiver decoding the receive control information for configuring the optical network element and receiving the client data traffic;
   c) a tunable laser that generates an optical signal at an output, the optical signal having an optical carrier with a wavelength;
   d) a modulator having an input that is optically coupled to the output of the tunable laser, the modulator imparting modulation directly onto the optical signal with the frequency that is less than the modulation frequency of a transmit client data traffic, the modulator thereby generating a first transmit optical control signal that represents transmit control information having the wavelength of the optical carrier and the modulator generating a second transmit optical control signal that configures an element in the hardware configured optical network, wherein the configuration of the element in the hardware configured network comprises automatic provisioning of a tunable channel and establishment of a data connection; and
   e) a second optical port that transmits the first transmit optical control signal representing the transmit control information to the hardware configured optical network.

2. The transceiver for the hardware configured optical network of claim 1 wherein the first and second transmit optical control signal are different transmit optical control signals.

3. The transceiver for the hardware configured optical network of claim 1 wherein the modulator further comprises an electrical modulation input that receives the transmit control information.

4. The transceiver for the hardware configured optical network of claim 1 wherein the modulator is configured to impart the transmit client data traffic on the optical signal.

5. The transceiver for the hardware configured optical network of claim 1 further comprising a second modulator having an input that is optically coupled to the output of the tunable laser and an output coupled to the input of the modulator, wherein the second modulator is configured to impart the transmit client data traffic on the optical signal.

6. The transceiver for the hardware configured optical network of claim 1 wherein the tunable laser is configured to generate a wavelength in a wavelength range from 1528 nm to 1567 nm.

7. The transceiver for the hardware configured optical network of claim 1 wherein the tunable laser is configured to generate a wavelength that determines a destination of the transmit optical control signal in the hardware configured optical network.

8. The transceiver for the hardware configured optical network of claim 1 wherein the tunable laser is configured to generate a wavelength that determines a path of at least one of the first and second transmit optical control signal in the hardware configured optical network.

9. The transceiver for the hardware configured optical network of claim 1 wherein at least one of the first and second transmit optical control signal comprises a multipoint communication protocol.

10. The transceiver for the hardware configured optical network of claim 1 wherein at least one of the first and second transmit optical control signal comprises a collision avoidance protocol.

11. The transceiver for the hardware configured optical network of claim 10 wherein the collision avoidance protocol comprises an Ethernet protocol.

12. The transceiver for the hardware configured optical network of claim 1 wherein the second transmit optical control signal that configures the element in the hardware configured optical network performs a turn-up operation of the element.

13. The transceiver for the hardware configured optical network of claim 1 wherein the second transmit optical control signal that configures the element in the hardware configured optical network performs a tuning of the element.

14. The transceiver for the hardware configured optical network of claim 1 wherein second transmit optical control signal that configures the element in the hardware configured optical network performs a programming operation of the element.

15. The transceiver for the hardware configured optical network of claim 1 wherein the transceiver is configured as a small form factor optical transceiver.

16. The transceiver for the hardware configured optical network of claim 15 wherein the small form factor optical transceiver comprises a SFP transceiver.

17. A method for automatically establishing a data connection in a hardware configured network, the method comprising:
  a) connecting a first transceiver that is tunable to an optical link in the hardware configured network;
  b) connecting a second transceiver to the optical link in the hardware configured network;
  c) generating at the first transceiver a transmit optical signal comprising client data traffic at a wavelength;
  d) encoding at the first transceiver a modulation representing control information by imparting a modulation onto the generated transmit optical signal comprising client data traffic at the wavelength having a modulation frequency that is less than a modulation frequency of the client data traffic, thereby generating a transmit optical control signal that represents the control information;
  e) transmitting the transmit optical control signal that represents the control information over the optical link and receiving the transmit optical control signal at the second transceiver;
  f) decoding at the second transceiver the control information encoded in the received transmit optical control signal using electrical filtering to remove the client data traffic from the received transmit optical control signal;
  g) configuring the second transceiver using the decoded control information and establishing the data connection between the first transceiver and the second transceiver over the optical link based on the configuration of the second transceiver; and
  h) tuning the wavelength generated by the first transceiver to determine a path in the hardware configured network.

18. The method for automatically establishing the data connection of claim 17 further comprising transmitting the transmit optical control signal that represents the control information through a wavelength selective switch.

19. The method for automatically establishing the data connection of claim 17 further comprising transmitting the transmit optical control signal that represents the control information through an optical amplifier.

20. The method for automatically establishing the data connection of claim 17 further comprising transmitting the transmit optical control signal that represents the control information through a programmable filter.

21. A method for automatically establishing a data connection in a hardware configured network, the method comprising:
  a) connecting a first transceiver to an optical link in the hardware configured network;
  b) connecting a second transceiver that is tunable to the optical link in the hardware configured network;
  c) generating at the first transceiver a transmit optical signal comprising client data traffic at a wavelength;
  d) encoding at the first transceiver a modulation representing control information by imparting a modulation onto the generated transmit optical signal comprising client data traffic at the wavelength having a modulation frequency that is less than a modulation frequency of the client data traffic, thereby generating a transmit optical control signal that represents the control information;
  e) transmitting the transmit optical control signal that represents the control information over the optical link and receiving the transmit optical control signal at the second transceiver;
  f) decoding at the second transceiver the control information encoded in the received transmit optical control signal using electrical filtering to remove the client data traffic from the received transmit optical control signal; and
  g) configuring the second transceiver by tuning a wavelength of the second transceiver using the decoded control information and establishing the data connection between the first transceiver and the second transceiver over the optical link based on the configuration of the second transceiver.

22. The method for automatically establishing the data connection of claim 21 further comprising transmitting the transmit optical control signal that represents the control information through a wavelength selective switch.

23. The method for automatically establishing a data connection of claim 21 further comprising transmitting the transmit optical control signal that represents the control information through an optical amplifier.

24. The method for automatically establishing a data connection of claim 21 further comprising transmitting the transmit optical control signal that represents the control information through a programmable filter.

25. A method for automatically establishing a data connection in a hardware configured network, the method comprising:
  a) connecting a first transceiver to an optical link in the hardware configured network;
  b) connecting a second transceiver to the optical link in the hardware configured network;
  c) generating at the first transceiver a transmit optical signal comprising client data traffic at a wavelength;
  d) encoding at the first transceiver a modulation representing control information by imparting a phase modulation onto the generated transmit optical signal comprising client data traffic at the wavelength having a modulation frequency that is less than a modulation frequency of the client data traffic, thereby generating a transmit optical control signal that represents the control information;
  e) transmitting the transmit optical control signal that represents the control information over the optical link and receiving the transmit optical control signal at the second transceiver;

f) decoding at the second transceiver the control information encoded in the received transmit optical control signal using electrical filtering to remove the client data traffic from the received transmit optical control signal; and g) configuring the second transceiver using the decoded control information and establishing the data connection between the first transceiver and the second transceiver over the optical link based on the configuration of the second transceiver.

26. The method for automatically establishing a data connection of claim 25 further comprising transmitting the transmit optical control signal that represents the control information through a wavelength selective switch.

27. The method for automatically establishing a data connection of claim 25 further comprising transmitting the transmit optical control signal that represents the control information through an optical amplifier.

28. The method for automatically establishing a data connection of claim 25 further comprising transmitting the transmit optical control signal that represents the control information through a programmable filter.

29. A method for automatically establishing a data connection in a hardware configured network, the method comprising:

a) connecting a first transceiver to an optical link in the hardware configured network;

b) connecting a second transceiver to the optical link in the hardware configured network;

c) generating at the first transceiver a transmit optical signal comprising client data traffic at a wavelength;

d) encoding at the first transceiver a modulation representing control information by imparting an amplitude modulation directly onto the generated transmit optical signal comprising client data traffic at the wavelength having a modulation frequency that is less than a modulation frequency of the client data traffic, thereby generating a transmit optical control signal that represents the control information;

e) transmitting the transmit optical control signal that represents the control information over the optical link and receiving the transmit optical control signal at the second transceiver;

f) decoding at the second transceiver the control information encoded in the received transmit optical control signal using electrical filtering to remove the client data traffic from the received transmit optical control signal; and g) configuring the second transceiver using the decoded control information and establishing the data connection between the first transceiver and the second transceiver over the optical link based on the configuration of the second transceiver.

30. The method for automatically establishing a data connection of claim 29 further comprising transmitting the transmit optical control signal that represents the control information through a wavelength selective switch.

31. The method for automatically establishing a data connection of claim 29 further comprising transmitting the transmit optical control signal that represents the control information through an optical amplifier.

32. The method for automatically establishing a data connection of claim 29 further comprising transmitting the transmit optical control signal that represents the control information through a programmable filter.

33. A method for automatically establishing a data connection in a hardware configured network, the method comprising:

a) connecting a first transceiver to an optical link in the hardware configured network;

b) connecting a second transceiver to the optical link in the hardware configured network;

c) generating at the first transceiver a transmit optical signal comprising client data traffic at a wavelength;

d) encoding at the first transceiver a modulation representing control information by imparting a modulation onto the generated transmit optical signal comprising client data traffic at the wavelength having a modulation frequency that is less than a modulation frequency of the client data traffic and that is less than 100 kHz, thereby generating a transmit optical control signal that represents the control information;

e) transmitting the transmit optical control signal that represents the control information over the optical link and receiving the transmit optical control signal at the second transceiver;

f) decoding at the second transceiver the control information encoded in the received transmit optical control signal using electrical filtering to remove the client data traffic from the received transmit optical control signal; and g) configuring the second transceiver using the decoded control information and establishing the data connection between the first transceiver and the second transceiver over the optical link based on the configuration of the second transceiver.

34. The method for automatically establishing a data connection of claim 33 further comprising transmitting the transmit optical control signal that represents the control information through a wavelength selective switch.

35. The method for automatically establishing a data connection of claim 33 further comprising transmitting the transmit optical control signal that represents the control information through an optical amplifier.

36. The method for automatically establishing a data connection of claim 33 further comprising transmitting the transmit optical control signal that represents the control information through a programmable filter.

* * * * *